(12) United States Patent
Vissenberg et al.

(10) Patent No.: US 8,475,010 B2
(45) Date of Patent: Jul. 2, 2013

(54) ILLUMINATION DEVICE COMPRISING A COLLIMATOR

(75) Inventors: Michel Cornelis Josephus Marie Vissenberg, Eindhoven (NL); Anthonie Hendrik Bergman, Eindhoven (NL); Tim Dekker, Eindhoven (NL); Giovanni Cennini, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 410 days.

(21) Appl. No.: 12/993,281

(22) PCT Filed: May 27, 2009

(86) PCT No.: PCT/IB2009/052213
§ 371 (c)(1),
(2), (4) Date: Nov. 18, 2010

(87) PCT Pub. No.: WO2009/144668
PCT Pub. Date: Dec. 3, 2009

(65) Prior Publication Data
US 2011/0085332 A1    Apr. 14, 2011

(30) Foreign Application Priority Data

May 30, 2008 (EP) .................................... 08157267
Sep. 2, 2008 (EP) .................................... 08163464
Oct. 24, 2008 (EP) .................................... 08167518

(51) Int. Cl.
*F21V 5/00*    (2006.01)
(52) U.S. Cl.
USPC ................. 362/311.12; 362/296.1; 362/326; 359/641

(58) Field of Classification Search
USPC .................. 362/235, 311.02, 311.12, 296.1, 362/326, 327, 333, 244, 253, 335, 317, 334; 359/641
See application file for complete search history.

(56) References Cited

U.S. PATENT DOCUMENTS

| | | | |
|---|---|---|---|
| 6,144,536 A | 11/2000 | Zimmerman et al. | |
| 6,379,017 B2 | 4/2002 | Nakabayashi et al. | |
| 6,601,984 B2 | 8/2003 | Yamamoto et al. | |
| 6,632,004 B2 * | 10/2003 | Sugawara et al. | ............. 362/281 |
| 6,742,907 B2 | 6/2004 | Funamoto et al. | |

(Continued)

FOREIGN PATENT DOCUMENTS

| | | |
|---|---|---|
| DE | 102006030646 A1 | 10/2007 |
| JP | 2004200072 A | 7/2004 |

(Continued)

*Primary Examiner* — Bao Q Truong
(74) *Attorney, Agent, or Firm* — Mark L. Beloborodov

(57) ABSTRACT

The invention provides an illumination device (1) comprising a lighting unit (2). The lighting unit (2) comprises a light source (100) and a substantially flat collimator (200), arranged to collimate light source light (111). The collimator (200) has an entrance window (210), an edge window (220), a top collimator surface (201), a bottom collimator surface (202), a first collimating side edge (230) and a second collimating side edge (240). The lighting unit has an optical axis (O). One or more of the top collimator surface (201), the bottom collimator surface (202), the first collimating side edge (230) and the second collimating side edge (240) comprise n*½ grooves (300), wherein n is a positive integer number, and wherein the grooves (300) independently have a longitudinal axis (301) having a groove direction angle ($\omega$) with the optical axis (O) $\geq 0°$ and & and $<90°$.

12 Claims, 14 Drawing Sheets

U.S. PATENT DOCUMENTS

| | | |
|---|---|---|
| 6,814,457 B2 | 11/2004 | Chang et al. |
| 6,896,386 B2 | 5/2005 | Kitazawa et al. |
| 7,025,482 B2 | 4/2006 | Yamashita et al. |
| 7,181,378 B2 | 2/2007 | Benitez et al. |
| 7,207,700 B2 * | 4/2007 | Fallahi et al. ............... 362/334 |
| 7,226,196 B2 | 6/2007 | Parker et al. |
| 7,347,329 B2 | 3/2008 | Burns et al. |
| 2002/0141191 A1 | 10/2002 | Li |
| 2003/0198456 A1 | 10/2003 | Steiner et al. |
| 2006/0164839 A1 * | 7/2006 | Stefanov ..................... 362/327 |
| 2007/0024971 A1 | 2/2007 | Cassarly et al. |
| 2007/0064431 A1 * | 3/2007 | Fallahi et al. ............... 362/334 |
| 2007/0133211 A1 * | 6/2007 | Yoneda et al. ............... 362/317 |
| 2007/0263388 A1 | 11/2007 | Lai et al. |
| 2008/0310166 A1 * | 12/2008 | Chinniah et al. ............ 362/268 |
| 2010/0039819 A1 * | 2/2010 | Fournier et al. ............. 362/268 |
| 2011/0273882 A1 * | 11/2011 | Pickard ........................ 362/237 |
| 2012/0327676 A1 * | 12/2012 | Schug .......................... 362/507 |

FOREIGN PATENT DOCUMENTS

| | | |
|---|---|---|
| JP | 2005285586 A | 10/2005 |
| JP | 2005347122 A | 12/2005 |
| JP | 2006108045 A | 4/2006 |
| JP | 2007042402 A | 2/2007 |
| WO | 2007/095049 A1 | 8/2007 |
| WO | 2008047278 A1 | 4/2008 |
| WO | 2008078226 A1 | 7/2008 |

* cited by examiner

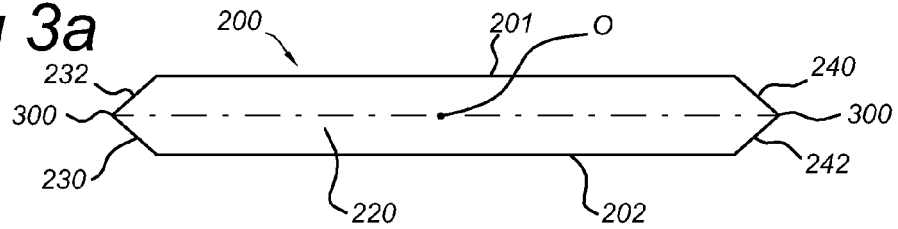
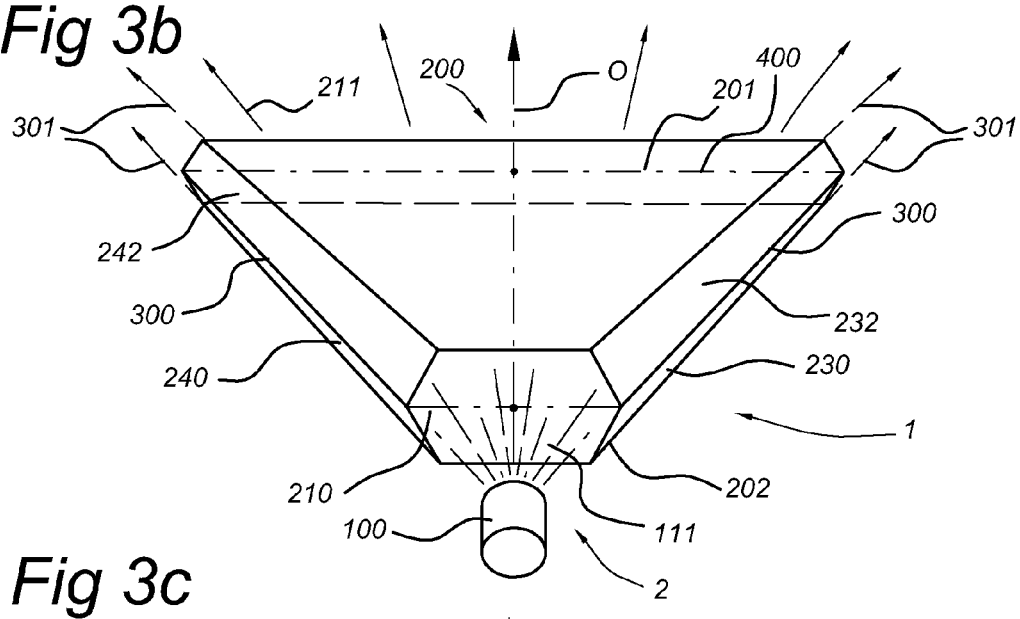
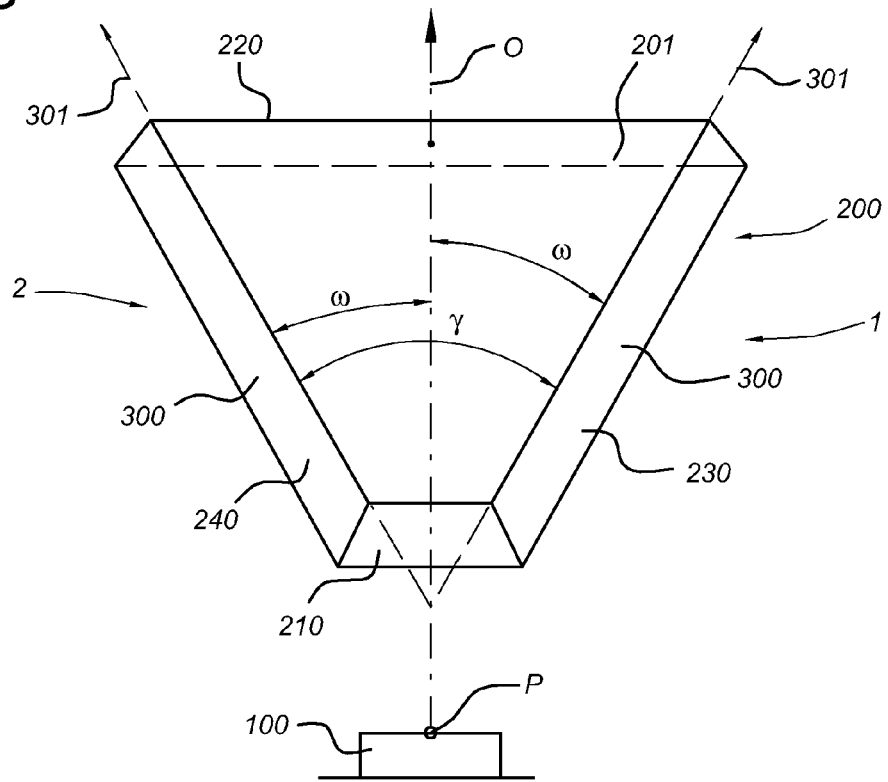

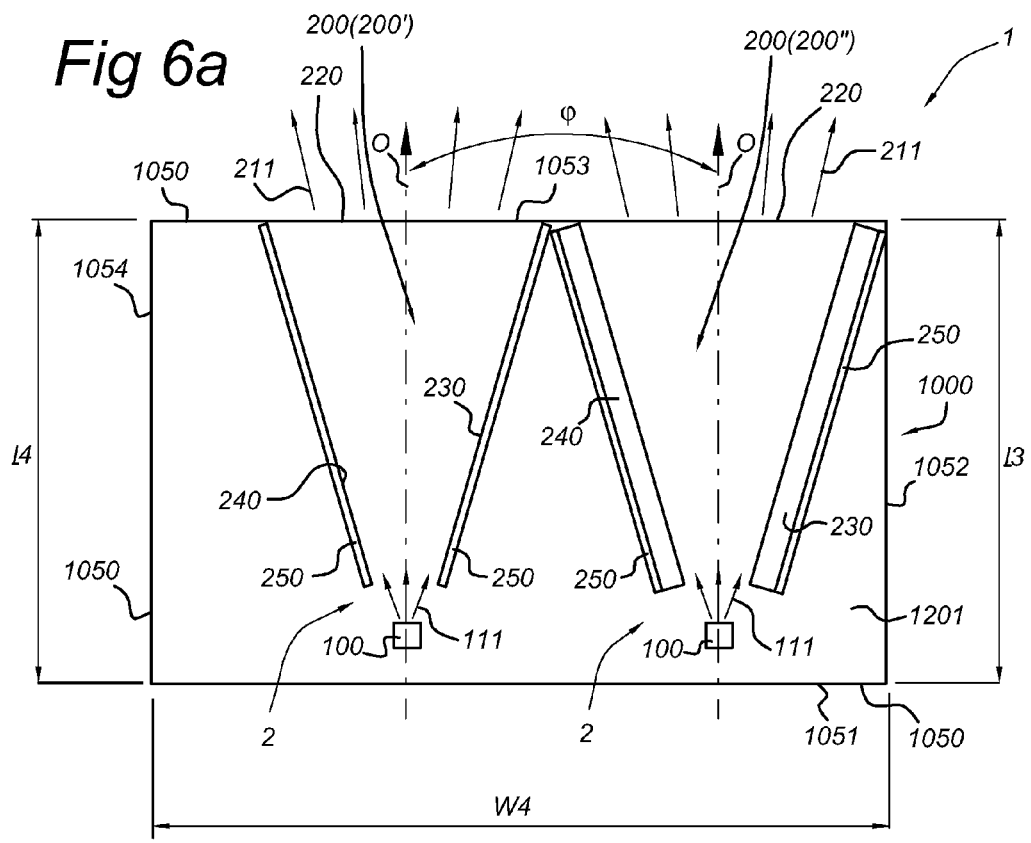
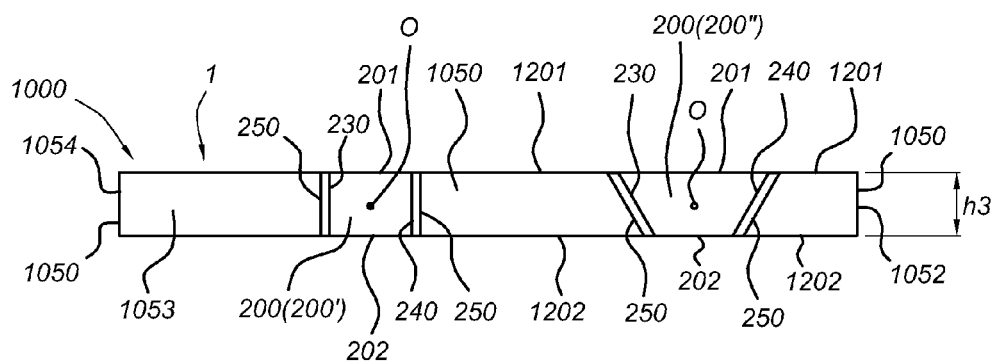

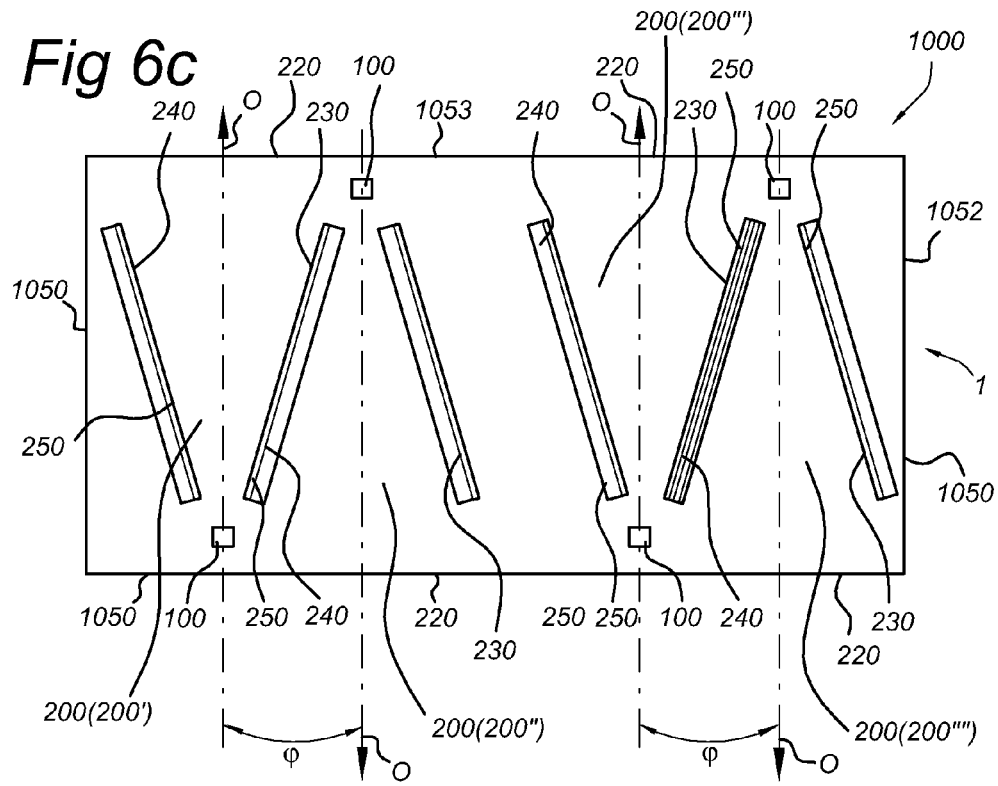
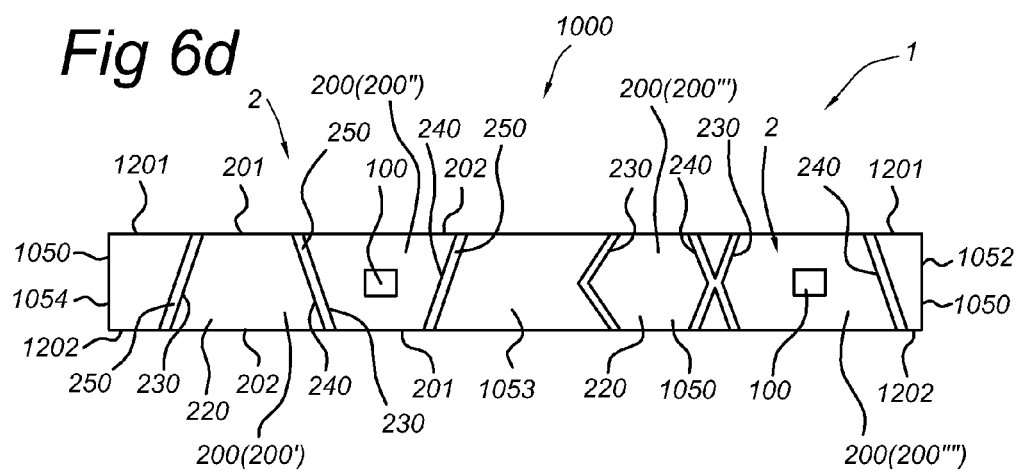

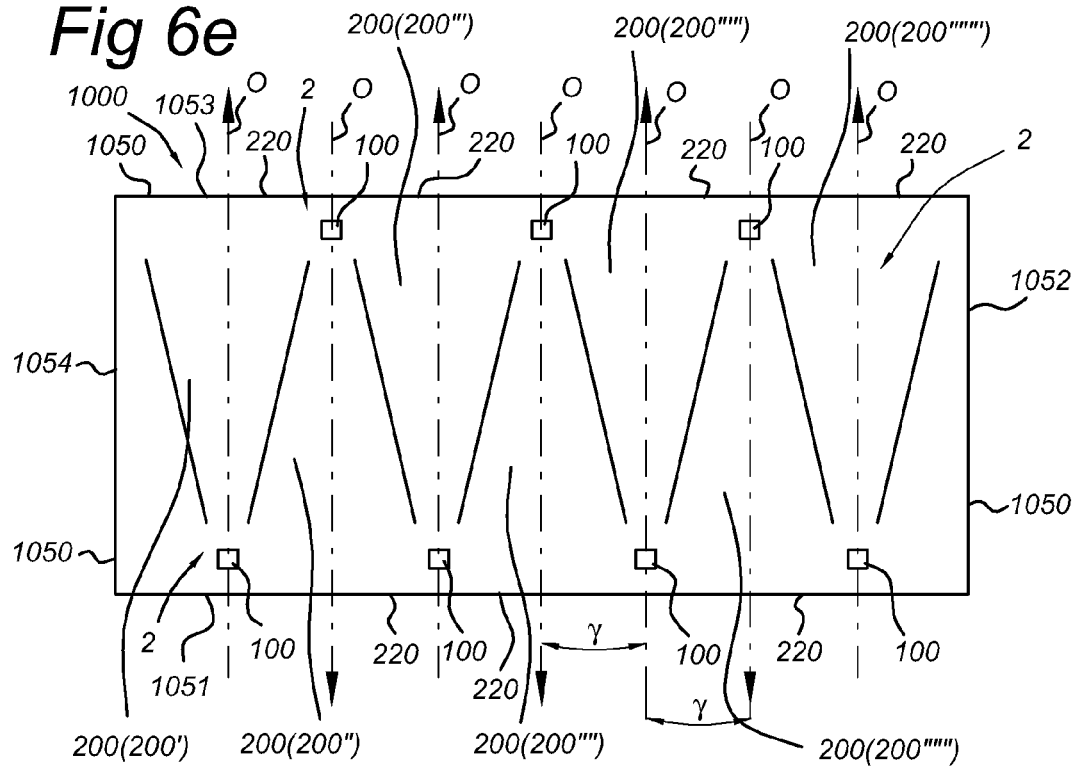
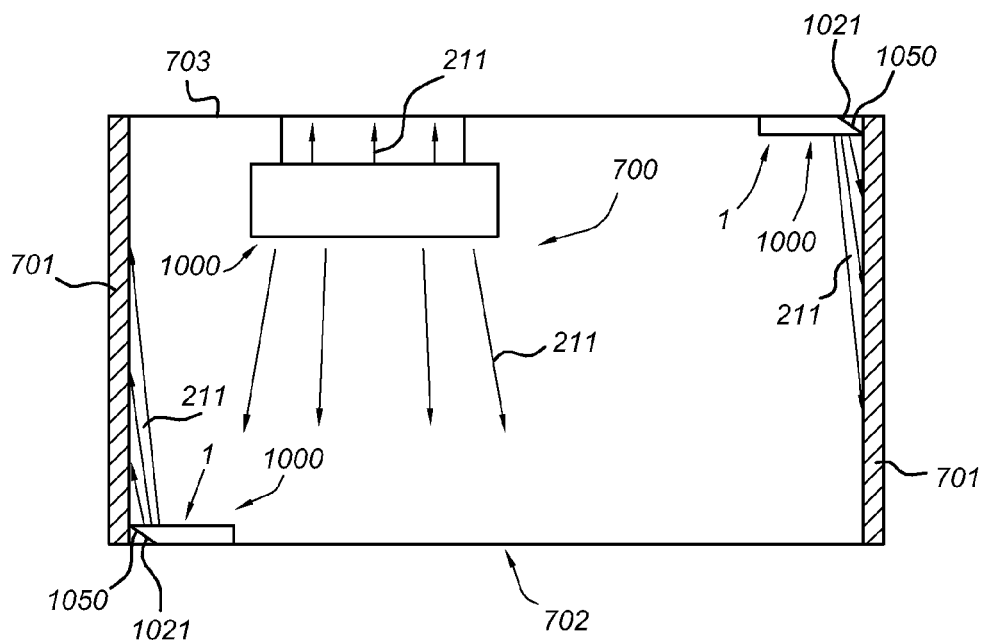

ILLUMINATION DEVICE COMPRISING A COLLIMATOR

FIELD OF THE INVENTION

The invention relates to an illumination device comprising a collimator, and especially to such illumination device for use as or in furniture.

BACKGROUND OF THE INVENTION

Relatively flat illumination devices are known in the art and are for instance described in U.S. Pat. No. 7,025,482 and U.S. Pat. No. 7,181,378.

U.S. Pat. No. 7,025,482 describes a light guide member and an illuminating device which are able to efficiently uniformly irradiate illumination light to only an area requiring illumination. Therefore, a reflection face is constructed by reflection stripes such as many grooves, etc. widened in a concentric circle shape. Light from a light source unit is widened toward this entire reflection face without irregularities by a diffusing portion such as a reflection prism, etc. Thus, only the range actually requiring the illumination can be illuminated without irregularities, and visibility of the illumination range using a front light is raised.

U.S. Pat. No. 7,181,378 describes apparatuses, and methods for manufacturing such apparatuses, to convert a first distribution of an input radiation to a second distribution of output radiation. The apparatus can be defined in some embodiments by generating a two-dimensional representation of three active optical surfaces including calculating a segment of first, entry and second surfaces based on first second, and third generalized Cartesian ovals, respectively, and successively repeating the calculating of the segments of the first and second surfaces, and rotationally sweeping the two-dimensional representation about a central axis providing a three-dimensional representation. In some embodiments, portion of the first and/or second surfaces can be totally internally reflective (TIR). This document especially describes a folded-optics apparatus comprising a body that receives light, the body comprising first, second and third surfaces; the third surface defining a cavity, and at least a portion of the third surface is refractive; the second surface extending generally radially away from the cavity, and the second surface comprising a reflective region; and at least a first portion of the first surface provides internal reflection folding and at least a second portion of the first surface provides refractive transition between the body and an exterior of the body.

Further, WO2008047278 describes a luminaire comprising a light guiding layer and a plurality of LEDs, which LEDs are accommodated in at least one hole arranged in the light guiding layer, for emitting light into the light guiding layer. The light guiding layer further comprises at least one outcoupling structure, for coupling the light out of the light guiding layer.

SUMMARY OF THE INVENTION

The availability of efficient high-flux LED packages allows for luminaire designs of unconventional shape. Elegant, flat lighting systems can be based on light guiding plates, i.e. plates of dielectric material like PMMA, PC, glass, etc. The advantage of such systems can on the one hand be their elegant appearance (i.e. a design advantage), but on the other hand their unobtrusive appearance (the thin form factor allows them to easily blend with their surroundings, or be hidden against walls or ceilings). In general, the light direction in the plane of such a light guide plate (also indicated herein as "longitudinal collimation") may be manipulated in a straightforward manner: by using incoupling structures (e.g. collimating funnels or beam broadening structures). Manipulation of the orthogonal light direction (perpendicular to the plate) (also indicated herein as "latitudinal collimation") usually requires thickness variations in the plate. A thickness increase (as in the case of a collimator) is in general however unwanted, since it may deteriorate the slim appearance of the system. On the other hand, a wedge-like thickness-decrease may complicate manufacturability (in particular the thin edge), and generally may need additional light directing optics that add thickness.

Hence, a problem is how to manipulate the light distribution in all directions without substantially varying the thickness of the light guide (or "collimator" or "waveguide"). The advantage of a system of substantially constant thickness is that it allows for elegant, thin luminaire designs that are relatively easy to manufacture, and which may relatively easily be installed as furniture (or furniture element) or implemented in furniture. Therefore, there is a desire to provide an alternative flat illumination device based on a light guide, and to further improve the beam shape of such flat light guides. Hence, it is an aspect of the invention to provide an alternative illumination device, which preferably further at least partially obviates one or more of above-described drawbacks, and which preferably provides a collimated beam or a more collimated beam.

According to a first aspect, the invention provides an illumination device arranged to generate illumination device light (herein also indicated as "device light"), the illumination device comprising a lighting unit, the lighting unit comprising a light source, arranged to generate light source light, and a substantially flat (planar) collimator, arranged to collimate the light source light, the collimator having an entrance window and an edge window, a top collimator surface and a bottom collimator surface, which are arranged substantially parallel, a first collimating side edge and a second collimating side edge, which are arranged to diverge from the entrance window to the edge window, the lighting unit further comprising an optical axis, wherein the entrance window is arranged to receive the light source light of the light source, wherein the edge window is arranged to allow the collimated light source light escape from the collimator as illumination device light, and wherein one or more of the top collimator surface, the bottom collimator surface, the first collimating side edge and the second collimating side edge comprise $n*\frac{1}{2}$ grooves, wherein n is a positive integer number, and wherein preferably the grooves independently have a longitudinal axis having a groove direction angle with the optical axis $\geq 0°$ and $<90°$.

It surprisingly appears that such device may provide a beam with advantageous beam shape, which may be well collimated in both longitudinal and latitude direction: such illumination device may be relatively flat, but nevertheless have a collimation in the plane of the waveguide or collimator as well perpendicular to the waveguide. It appears that this collimation may be obtained by introducing grooves in the one or more of the top collimator surface (also indicated herein as "top surface"), the bottom collimator surface (also indicated herein as "bottom surface"), the first collimating side edge (also herein indicated as "first side edge") and the second collimating side edge (also herein indicated as "second side edge"), and thus without substantially further introducing widening or narrowing features. Hence, in this way a flat collimator may be provided, having collimation in both directions.

Herein, terms like "perpendicular", "parallel", "planar", "flat", and "equal", etc., especially relate to embodiments with substantial perpendicular, substantial parallel, substantial planar, substantial flat and substantially equal, etc., features, as will be clear to the skilled person in the art. Hence, "parallel" or "substantially parallel" may relate to angles of features of about 0° (including 0° (thus also) 180°)), but especially less than about 6°, more preferably less than about 2°, even more preferably less than about 1°. Likewise, "perpendicular" or "substantially perpendicular" may relate to angles of about 90° (including 90° (thus also 270°)), but especially angles deviating less than about 6°, more preferably less than about 2°, even more preferably less than about 1°, from 90°.

The term "independently" herein may indicate that, within physical boundaries, the groove direction angle of each individual groove may be selected independent from all other grooves. Especially in radially arranged grooves, this will be the case and the groove direction angle may be different for each groove.

Herein, instead of the term "collimator" also the term "waveguide" is applied. The collimator of the invention may also be interpreted as a waveguide having collimating properties. Herein, the term light guide or waveguide are interchangeably used.

Even by arranging one or more of the first collimating side edge and the second collimating side edge slanted, i.e. providing half a groove to one of more of such side edges, may already provide collimation. Therefore, in an embodiment, one or more of the first collimating side edge and the second collimating side edge comprise ½ groove, respectively. Preferably, both the first collimating side edge and the second collimating side edge comprise ½ groove, respectively.

In yet a further embodiment, one or more of the first collimating side edge and the second collimating side edge comprise a V-shape, respectively. Preferably, both the first collimating side edge and the second collimating side edge comprise such V-shape, respectively. Such V-shape, with protruding top can in fact be considered as two half grooves (with adjacent or coinciding tops).

However, one or more of these side edges may also have a plurality of grooves, which may even further enhance collimation. Therefore, one or more of the first collimating side edge and the second collimating side edge comprise a plurality of grooves, respectively, wherein the plurality of grooves comprised by the one or more of the first collimating side edge and the second collimating side edge are preferably substantially parallel, respectively. Preferably, both the first collimating side edge and the second collimating side edge comprise the plurality of grooves, respectively. Herein the phrase "wherein the plurality of grooves comprised by the . . . side edge are substantially parallel" indicates that when a plurality of grooves on/in a side face is applied, these grooves are especially arranged parallel to each other, i.e., the grooves may have elongation axes (or longitudinal axes), which are substantially parallel, and are thus also substantially parallel to the top collimator surface and/or the bottom collimator surface. Note that since the side edges diverge (it is a collimator), the plurality of grooves on the first collimating side edge and the plurality of groove on the second collimating side edge may also diverge from each other. Thus, the parallelism of the grooves, or more precisely of the longitudinal axes, relate to the (plurality of) grooves of the side edges, respectively.

In addition or alternatively to the groove(s) on the collimating side edges, advantageously, also grooves may be arranged onion the top collimator surface and/or bottom collimator surface. Therefore, in an embodiment of the illumination device one or more of the top collimator surface and the bottom collimator surface comprise a plurality of grooves.

In a preferred embodiment, the plurality of (these) grooves may virtually converge at a position coinciding with the light source. Here the phrase "position coinciding with the light source" indicates the position of the light source where the light source emits light (i.e. its light emitting part (like the light emitting surface of an LED, the discharge of a discharge source, or the filament of a incandescent type of lamp). Note that the illumination device may have a light source that can be considered in approximation as a point source, but may also have a line source (such as a luminescent tube; TL), which may then especially be arranged substantially perpendicular to the top collimator surface and/or the bottom collimator surface. When the plurality of grooves virtually converge at a position coinciding with the light source, the best collimation may be obtained. However, the plurality of grooves may virtually converge at a position upstream of the light source, for instance within about 0-100 cm, like about 0-10 cm. In fact, the plurality of grooves may virtually converge at a position infinitely upstream of the light source: hence, in an embodiment, the plurality of grooves are arranged substantially parallel. Even then, even better collimation is obtained than without the (plurality) of grooves. Choosing the convergence allows controlling the collimation. The amount of latitudinal collimation may be a measure of the effectiveness of the grooves. When the convergence point lies more upstream, the latitudinal collimation may relatively be worse, but the longitudinal collimation relatively becomes better.

The grooves may also be indicated as elongated structures. In an embodiment, the grooves have V-shape profiles (i.e. here an integral and not a ½ groove is discussed, but the principle may also apply to ½ grooves). In another embodiment, the grooves have curved profiles, such as sine like shapes. As will be clear to a person skilled in the art, combinations of differently shaped grooves may also be applied.

Due to the nature of the illumination device, the grooves may have an elongation axis (herein also indicated as "longitudinal axis" of the groove). Preferably, a part of the total number of the grooves (such as 10-100%, especially 20-100% of the total number of grooves) have a length in the range of about 50-100% of a length of the collimator surface(s) and/or collimator side edge(s) by which they are comprised, respectively. The grooves may have a constant width and/or height, or the width and/or height, independently of each other, may vary over the waveguide. In this way, the entire surface of the collimator surface(s) and/or collimator side edge(s) may comprise the grooves, respectively, but it may also be chosen to leave spaces between two adjacent grooves.

In an embodiment, the light source comprises a LED, such as a high power LED. In another embodiment, the light source comprises a plurality of LEDs (light emitting diodes). The plurality of LEDs may in an embodiment comprise LEDs of the same emission colour, but may in an embodiment also comprise LEDs of different emission colours (such as yellow and blue LEDs, or red, green and blue LEDs, etc.). The light source may also comprise other light sources than LEDs, such as for instance compact fluorescent lamps, halogen lamps or laser diodes, etc. In addition to the light source, further also luminescent materials may be applied, to convert at least part of the light of the light source into light having another wavelength.

The collimator may comprise a solid transparent waveguide but may also comprise a hollow waveguide. In an embodiment, the entrance window and/or the edge window are open windows, i.e. no transparent material (other than air) is present. In such embodiments, the collimator may essentially be composed of top and bottom surface and the side edges.

However, in a preferred embodiment, the waveguide comprises a solid transparent waveguide, especially a planar solid transparent waveguide (such as a plate). The solid transparent waveguide may comprise an material selected from the group consisting of PET (polyethylene terephthalate), PE (polyethylene), PP (polypropylene), PC (polycarbonate), P(M)MA (poly(methyl)metacrylate), PEN (polyethylene napthalate), PDMS (polydimethylsiloxane), and COC (cyclo olefin copolymer). PMMA gave for instance good results. However, the solid transparent waveguide may also comprise a material selected from the group consisting of inorganic transparent materials. Preferred inorganic materials are selected from the group consisting of glasses, (fused) quartz, ceramics, and silicones, especially glass.

When the waveguide comprises a solid transparent material, due to total internal reflection (TIR), the first and/or second waveguide surface do not necessarily comprise a reflective material, since they may be arranged to be reflective due to TIR.

The edge window is especially arranged opposite the entrance window (and may especially be arranged perpendicular to the optical axis. The edge window may be arranged as exit window, i.e. light (more precisely collimated light source light) light escapes from the collimator at this edge, but may also be arranged to reflect the collimated light from the collimator and escape in this way from the collimator. Hence, the edge window is arranged to allow the collimated light source light escape from the collimator. The optical axis may be considered as the average direction of the light, which is determined by the orientation of both the source and the collimator.

Hence, in an embodiment the edge window may be arranged to provide the device light. In another embodiment, the edge window is arranged to reflect the light source light to the exterior of the illumination device, thereby providing illumination device light. The edge window may also be indicated as outcoupling structure, which is arranged to couple the light, either "directly" via transmission through the edge window or "indirectly" via reflection and subsequent transmission (especially through one of the first or the second waveguide surface).

To provide outcoupling of light in a direction other than parallel to the collimator bottom and/or top surface, the edge window may be slanted. Hence, in an embodiment the edge window has a slant angle relative to the top collimator surface or the bottom collimator surface in the range of 35-105°. Hence, in an embodiment, the edge window has a slant angle relative to the top collimator surface or the bottom collimator surface in the range of about 75-105°, such as about 85-95°, such as 90° (in fact this may called "unslanted"). In another embodiment, the edge window has a slant angle relative to the top collimator surface or the bottom collimator surface in the range of about 35-55°, especially about 40-50°, more especially about 45°. Slant angles in the range of about 75-105° are especially useful when the edge window is arranged to transmit the light and couple this light source light out as illumination device light. Slant angles in the range of about 35-55° are especially useful when the edge window is arranged to reflect the light source light and couple this light source light out as illumination device light via the first or the second waveguide surface. In the former embodiment, the edge window may further comprise a diffuser; in the latter embodiment the edge window may further preferably comprise a reflector.

The edge window may also be curved, both in a direction from the top surface to the bottom surface and/or in a direction to from the first side face to the second side face. Assuming an edge window comprising a solid transparent material, the edge window may be flat (including slanted), may be curved, but may also be facetted. Hence, in an embodiment, the waveguide comprises a facetted edge window. Combinations of such embodiments may also be possible.

When the waveguide comprises a solid transparent material, and the edge window is slanted, the edge window is especially arranged to reflect the light source light to the exterior of the illumination device, thereby providing device light. In such embodiments, the edge window may further optionally comprise a reflector or a diffuser. Outcoupling of the light may in such embodiment occur via the first or the second waveguide surface.

In another specific embodiment, the edge window has a V-shape profile, i.e. it has a slant angle relative to the top collimator surface and has another slant angle relative to the bottom collimator surface. Such embodiment may be applied to couple light out to both sides of the illumination device, it to a side away from the top collimator surface and to a side away from the bottom collimator surface.

In an embodiment, the waveguide may comprise a plurality of (slanted) edge windows. This may for instance be obtained by providing additional reflective (slanted) surface(s) in the waveguide, for instance by introducing (slanted) slits (herein also indicated as air slits) in the waveguide. Such (slanted) slits may also act as reflectors (like a slanted edge window), and thereby act as additional edge windows. The slant angles of the individual edge windows may be independent of each other. Note that the slant angle may in principle also vary over edge window (i.e. vary in a plane perpendicular to the central axis). As mentioned above, the slanted edge window may further comprise a reflector or a diffuser.

The combination of a light source and the collimator (the lighting unit) can be used per se as illumination device, but may also be integrated in a larger entity, especially a plate. Hence, in a further aspect, the invention provides an embodiment of the illumination device, comprising a substantially flat plate comprising the lighting unit, the plate having a top plate surface, a bottom plate surface, and an plate edge, wherein the top collimator surface coincides with at least part of the top plate surface or at least part of the bottom plate surface and wherein the bottom collimator surface coincides with at least part of the bottom plate surface or at least part of the top plate surface. An advantage of such a construction is that such an illumination device may (more easily) be used as furniture or incorporated in furniture (as furniture element). Another advantage is that such plate may comprise a plurality of collimators. In principle, one light source may serve more than one collimator. However, preferably, each collimator has its "own" light source. Note that the term "light source" may also include a plurality of light sources. Therefore, in a specific embodiment, the illumination device comprises (a plate comprising) a plurality of lighting units.

Advantageously, the side edges of the collimators may be obtained by "air slits" in the plate. This may also allow arranging the collimators, or arranging the lighting units, to share (parts of) the air slits. For instance in this way, an embodiment of the illumination device may be obtained, wherein the first collimating side edge of a first collimator is substantially parallel with the second collimating side edge of a second collimator adjacent to the first collimator (i.e. substantially parallel optical axes, although the direction of the optical axes is opposite).

Actually, any angle (optical axes angle) between two adjacent collimators may be possible. In specific embodiments, the optical axes have an optical axes angle of substantially 180°, i.e. an opposite direction of the optical axes, or the optical axes have an optical axes angle of substantially 0°, i.e. parallel optical axes.

The illumination device according to the invention may advantageously be used as furniture or as furniture element; especially, the illumination device may be used as wall washer.

Note that the terms first and second, and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Note that the terms "bottom" and "top" are only used to elucidate in a clear way the different elements, such as faces of objects. The use of the terms "bottom" and "top" does not limit the illumination device of the invention as claimed, neither its use, to the configurations schematically depicted in the accompanying drawings. In addition, illumination devices arranged in other configuration than as depicted are claimed herein.

The terms "upstream" and "downstream" relate to an arrangement of items or features relative to the propagation of the light from the light source, wherein relative to a first position within a beam of light from the light source, a second position in the beam of light closer to the light source is "upstream", and a third position within the beam of light further away from the light source is "downstream".

BRIEF DESCRIPTION OF THE DRAWINGS

Embodiments of the invention will now be described, by way of example only, with reference to the accompanying schematic drawings, in which non-limiting substantially planar waveguides are schematically depicted, in which corresponding reference symbols indicate corresponding parts, and in which:

FIGS. 3a-3c schematically depict an embodiment of the collimator having side edges with a single groove (in front, back/perspective, and top view, respectively);

FIGS. 6a-6e schematically depict embodiments of a plate comprising a plurality of lighting units;

FIG. 7 schematically depict embodiments of the use of the illumination device of the invention.

Figure 1A:
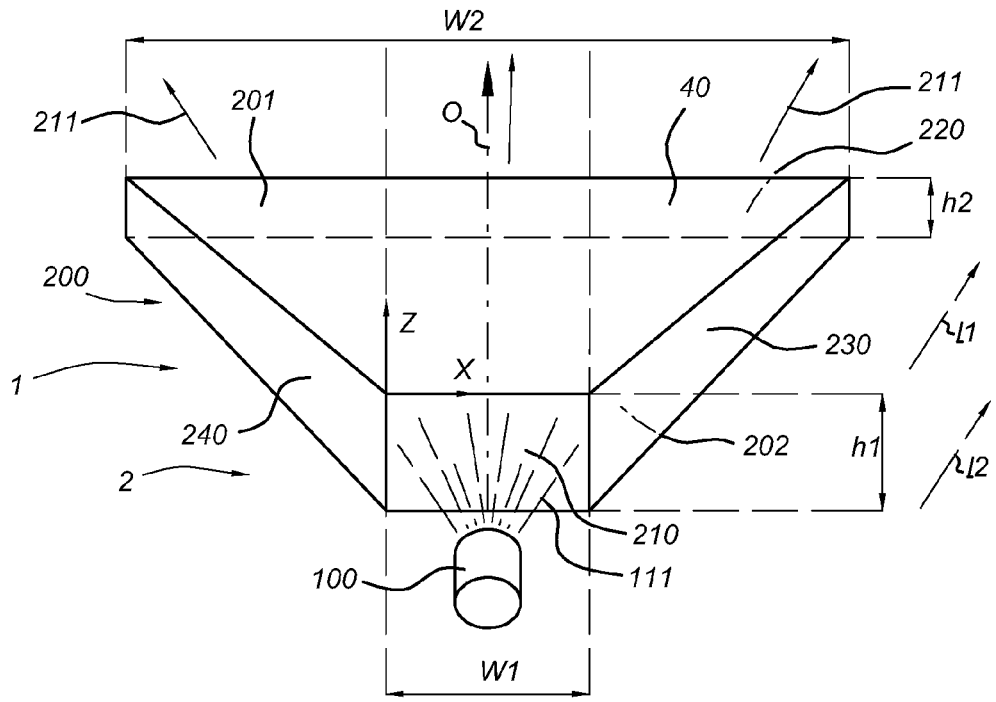
FIGS. 1a-1e schematically depict some principles of embodiments of a collimator.

For the sake of clarity, optional further optics or (other) peripheral equipment, such as reflectors, mirrors, heat sinks, diffusers, further collimators, power sources, electric wires, luminescent materials, etc. have not been depicted in the drawings.

DESCRIPTION OF PREFERRED EMBODIMENTS

Figure 1B:
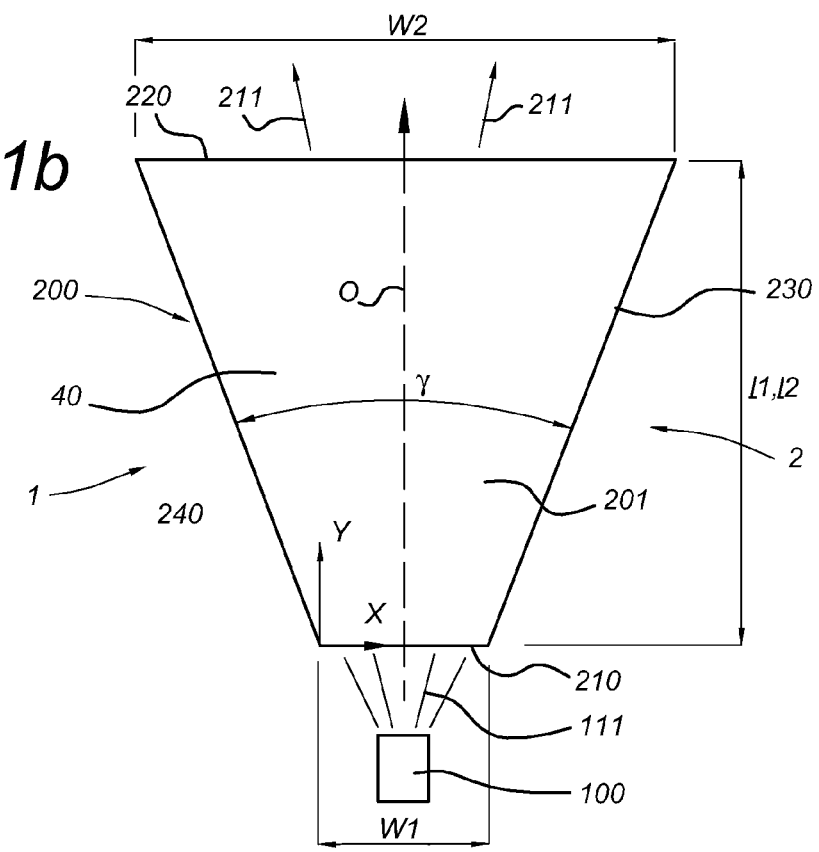
Figure 1C:
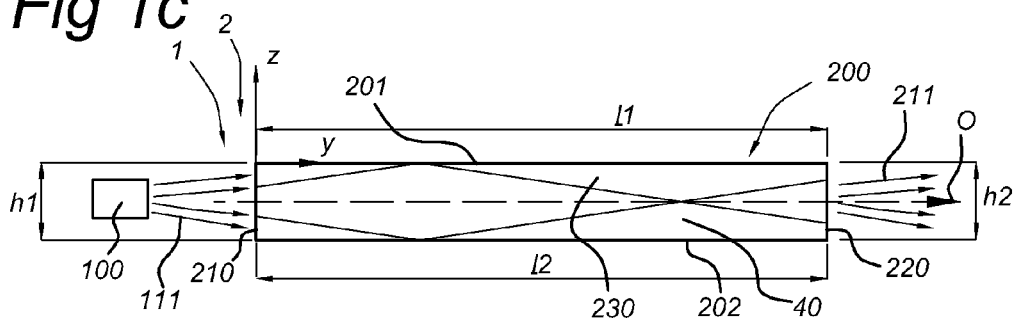

FIGS. 1a-1c schematically depicts an illumination device 1 arranged to generate device light 211. The illumination device 1 comprising a lighting unit, indicated with reference 2. The lighting unit 2, comprises a light source 100, arranged to generate light source light 111, and a substantially flat collimator 200, arranged to collimate the light source light 111 and provide the device light 211.

The light source 100 may be any light source, but may especially be a LED (including a plurality of LEDs).

The collimator 200 is a waveguide, which may be solid or hollow. Herein, it is further referred to solid waveguides, which are indicated with reference 40. The collimator 200 has an entrance window 210 and an edge window 220, a top collimator surface 201 ("top surface") and a bottom collimator surface 202 ("bottom surface"), which are preferably arranged substantially parallel, a first collimating side edge 230 ("first side edge") and a second collimating side edge (240) ("second side edge"). The first collimating side edge 230 and the second collimating side edge 240 are edges of the collimator 200, especially arranged to collimate, and have a mutual angle or opening angle γ (see further below).

The first and the second side edges 230 and 240 are arranged to diverge from the entrance window 210 to the edge window 220. This can also be derived from the figures, since a collimator entrance window width W1, at the entrance window 210, is smaller than a collimator edge window width W2, at the exit window 220. This divergence may occur as a result of a divergence of the first side edge and/or of the second side edge (in general a symmetric collimator 200 is preferred).

As mentioned above, the top collimator surface 201 and bottom collimator surface 202 are preferably arranged substantially parallel, which can also be derived from this schematic drawing, since a collimator entrance window height h1 is substantially equal to a collimator edge window height h2. In general, h1/h2 will be in the range of about 0.9-1.1, preferably about 1. Preferably, here the term "substantially parallel" indicates that an angle by the top collimator surface 201 and bottom collimator surface 202 is especially less than about 6°, more preferably less than about 2°, even more preferably less than about 1°, and most preferably 0°. Herein, the embodiments are depicted with parallel top collimator surface 201 and bottom collimator surface 202.

The length of the edges 230,240 along the top face 201 is indicated with reference L1 and the length of the edges 230, 240 along the bottom face 202 is indicated with reference L2. In this schematic drawing, without slanted edges, L1 and L2 are substantially equal.

The entrance window 210 is arranged to receive the light source light 111 of the light source 100 and the edge window 220 is arranged to allow the collimated light source light 111 escape from the collimator 200 as illumination device light 211.

For the sake of understanding, an optical axis O is depicted, along which the collimated light source light 111 and the device light 211 propagates. This optical axis O is the optical axis of the lighting unit 2. The optical axis O may be considered as the average direction of the light 111, which may be determined by the orientation of both the source 100 and the collimator 200. As will be clear to the person skilled in the art, these are preferably aligned. Since the optical axis can be considered as the average direction of the light 111, it is herein indicated as vector, showing the downstream direction of the light 111.

Figure 2A:
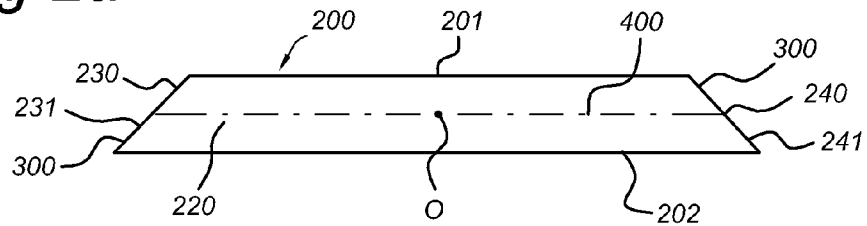
FIGS. 2a-2c schematically depict embodiments of the collimator having side edges with ½ groove (in front and back/perspective view, respectively)
Figure 2B:
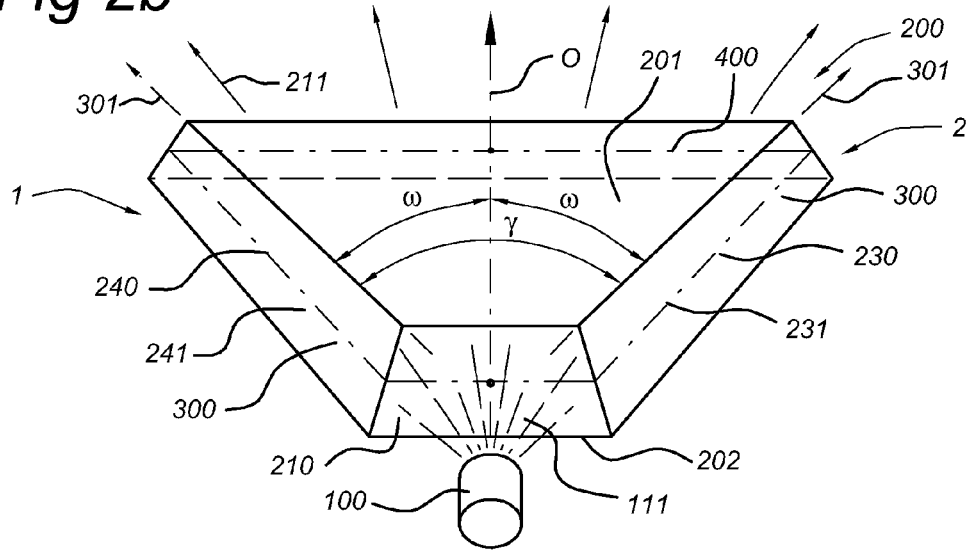

This optical axis O is especially in a plane substantially parallel to the top collimator surface 201 and/or bottom collimator surface 202: The optical axis O partly coincides with a (virtual) plane parallel with the xy-plane and is also parallel to this plane parallel with the xy-plane (this plane is indicated in FIGS. 2a and 2b). The xy-plane can further be defined as a plane substantially parallel to the top face 201 and/or the bottom face 202. As mentioned above, the top and bottom faces 201,202 are (substantially) parallel in preferred embodiments. Hence, the xy-plane is (substantially) parallel to the top face 201 and bottom face 202. The optical axis O is parallel to this plane and coincides with this plane parallel with the xy-plane.

FIG. 1b schematically depicts the same collimator 200 as schematically depicted in FIG. 1a, but now in top view. Hence, in this schematically depicted embodiment and in this view, L1 and L2 are equal, and W1 and W2 are unequal.

The collimator 200 may have an opening angle γ. In this schematically depicted symmetric embodiment, relative to the optical axis O, the first side edge 230 diverges with ½γ and the second side edge 240 also diverges with ½γ. The opening angle γ may be defined as the angle between the collimating side edges 230,240. Since the collimating side edges 230,240 in this embodiment are straight, the opening angle γ of the collimator 200 does not substantially vary over the (length of the) side edges 230,240. In general, the opening angle γ will preferably be in the range of $\geq 0°$ and <180°, especially in the range of about 45-135°. This may especially apply for hollow collimators 200. For a solid collimator 200, i.e. wherein the collimator 200 is a solid transparent waveguide, the opening angle γ will preferably be in the range of about 0-90°, especially about 10-70°.

Collimators 200 may also have collimating side edges 230, 240 that may be curved, e.g. convex or concave. Typical collimator shapes are parabolic. In such embodiments, the opening angel γ may vary over the side edge. For the sake of understanding, herein most of the collimators 200 are schematically depicted with straight collimating side edges 230, 240, except for FIGS. 1e and 2c (see below).

FIG. 1c schematically depicts the same collimator 200 as schematically depicted in FIG. 1a, but now in side view. Hence, in this schematically depicted embodiment and in this view, h1 and h2 are equal, and L1 and L2 are equal.

Figure 1D:
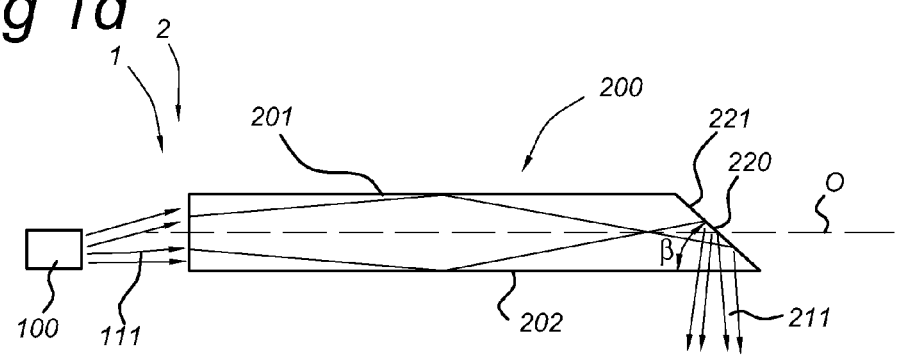

FIG. 1d schematically depicts an embodiment of the lighting unit 2 with collimator 200, which is substantially the same as the embodiments schematically depicted in FIGS. 1a-1c, with the exception that the edge window 220 is slanted. Such slanted edge window is indicated with reference 221. The edge window 220 may for instance have a slant angle β relative to the top collimator surface 201 or the bottom collimator surface 202 in the range of 35-105°. In FIG. 1d, the slant angle β is indicated relative to bottom face 202, and has a value of about 45°. In FIGS. 1a-1c the edge window is not "slanted", and the "slant angle β" is about 90°. By using a slant angle, especially in the range of about 35-55°, collimated light source light may escape from the collimator 200 via one of the bottom and top surfaces 201,202 as device light 211. Depending upon the shape of the edge window 220 (slanted, V-shape ("double slanted"), curved), the collimated light source light may escape from the collimator 200 as device light 211 via one or both of the bottom and top surfaces 201,202.

Figure 1E:
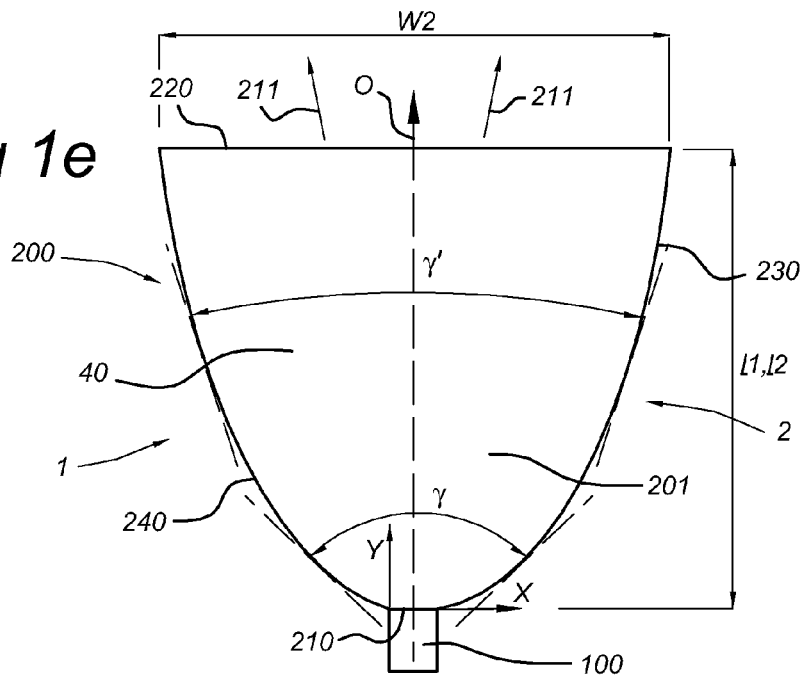

FIG. 1e schematically depicts an embodiment of the lighting unit 2 with collimator 200, wherein the collimating side edges 230,240 diverge (both) in a curved way. Hence, the collimating side edges 230,240 are curved. Therefore, the opening angle γ of the collimator, also varies over the collimating side edges 230,240, which is indicated with γ and γ', etc. The opening angle in such curved embodiments may be defined as the angle between tangent lines at the respective collimating side edge 230,240. In general, again, the opening angles will preferably be in the range of $\geq 0°$ and <180°.

Figure 2C:
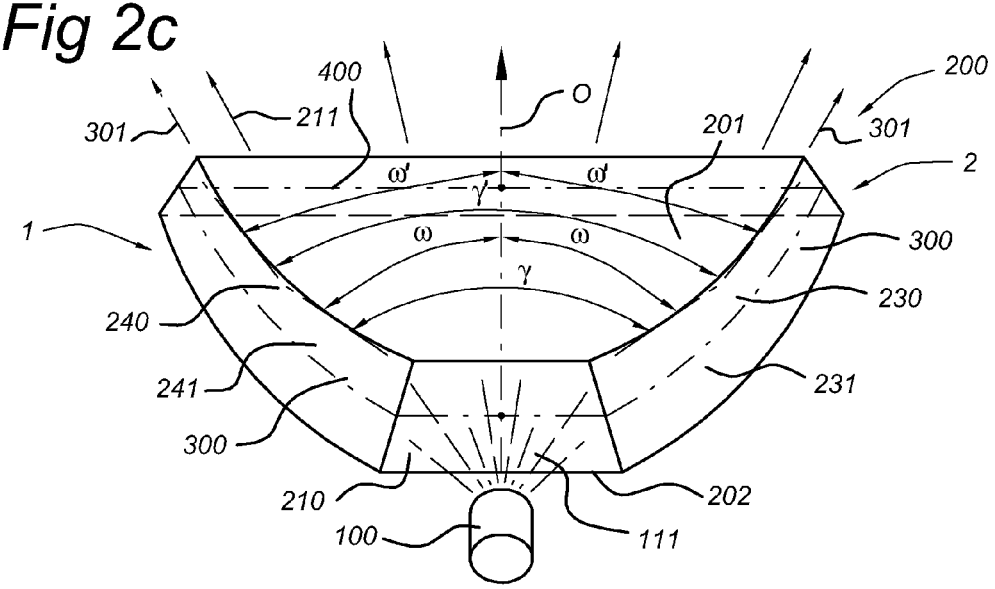

Note that in a preferred embodiment, the side edges 230 and 240 are curved in a direction from the entrance window 210 to the edge window 220, i.e. the opening angle γ varies over the side edges 230,240 (such as schematically depicted in FIGS. 1e and 2c). However, in another embodiment (which may be combined with straight or curved side edges 230,240, the side edges 230,240 may (also) be curved in a direction from the top surface 201 to the bottom surfaces 202 (or vice versa). Such embodiments are herein not depicted.

As mentioned above, one or more of the top collimator surface 201, the bottom collimator surface 202, the first collimating side edge 230 and the second collimating side edge 240 comprise n*½ grooves 300, wherein n is a positive integer number (such as 1, 2, 3, ... 100, ..., etc.), and wherein the grooves 300 independently have a longitudinal axis 301 having a groove direction angle ω with the optical axis (O) $\geq 0°$ and <90°. Note that the arrangement of the grooves on one or more of these faces may be selected independent from each other, for instance: the first side edge 230 may comprise grooves 300 only, or the second side edge 240 and the bottom surface 202 comprise grooves, etc. Therefore the phrase "one or more" is applied.

These grooves 300 are for the sake of simplicity not drawn in the above schematic drawings. Having however described the lighting unit 2, and especially the collimator 200, in FIGS. 1a-1d, in the next figures, the arrangement of the grooves is schematically depicted and below further elucidated in more detail. FIGS. 2a-2c, 3a-3c and 4a-4b schematically depict embodiments of grooves 300 comprised by the side edges.

As mentioned above, one or more of the first collimating side edge 230 and the second collimating side edge 240 may comprise ½ groove 300, respectively. FIGS. 2a-2b schematically depict an embodiment of the collimator 200 having both side edges 230,240 with ½ groove 300 (in front and back/ perspective view, respectively). Actually, such side edges 230,240 can be seen as slanted side edges 230,240. The first side edge 230 comprising ½ groove is indicated with reference 231; the second side edge 240 comprising ½ groove is indicated with reference 241.

As mentioned above, the optical axis O is indicated as vector. Further, FIGS. 2a and 2b schematically depict a plane parallel to the xy-plane, which plane is indicated with reference 400. As shown, the optical axis O coincides with this plane. Further, the top face 201 and the bottom face 202 are substantially parallel to this plane 400. This plane 400 can (also) be defined as a plane substantially parallel to the top face 201 and/or the bottom face 202. Since these latter two faces are preferably parallel, in a preferred embodiment, the plane 400 can (also) be defined as a plane substantially parallel to the top face 201 and the bottom face 202. Depending upon the placement of the (virtual) xy-plane, this plane 400 might coincide with the xy-plane. Anyhow, the plane which coincided with optical axis O and which is substantially parallel to the top face 201 and the bottom face 202 is indicated as plane 400 herein.

The groove(s) 300 can be seen as elongated structure(s), having a longitudinal axis (or elongation axis or groove axis) 301 along or in the direction of the groove 300. The grooves 300 are either arranged substantially parallel (see embodiments below wherein such grooves 300 are comprised by the top and/or bottom collimator surfaces 201,202, respectively, or the groove(s) are arranged to substantially or partially parallel with the light source light 111 in the collimator 200. Hence, the grooves 300 may also diverge in a downstream direction.

Thus, in an embodiment grooves 300, or at least a subset thereof, are arranged substantially parallel. In another embodiment, that may be combined therewith, grooves 300, or at least a subset thereof, are arranged diverging in a downstream direction.

Therefore, the grooves 300 are considered to have a groove axis 301 (which is parallel with the groove 300 and may coincide with the groove valley), and which is also indicated with a vector (with a downstream direction). A further reason to indicate the groove axis 301 as vector, is to define a groove direction angle ω of the groove axis 301 with the optical axis O. Assuming the optical axis O to be parallel to the y-axis in a Cartesian coordinate system (as depicted in some of the figures), a groove 300 having a direction angle ω of 90° would be along the positive or negative x-axis, which would not provide the advantageous collimation according to the invention. A groove 300 having a direction angle ω of 0° would be parallel the optical axis O, and may provide collimation.

Actually, the direction angle ω is more precisely defined as the angle between a projection of the groove axis 301 on the plane 400 (parallel with the xy-plane) and the optical axis O in this plane 400 (parallel with the xy-plane).

FIG. 2c schematically depicts the same embodiments as schematically depicted in FIGS. 2a and 2b, however, in FIG. 2c the side edges 230,240 are curved. This means that the groove angle ω also varies over side edges 230,240, which is indicated with ω, ω', etc. In such curved embodiments, the groove angle(s) γ may further be defined as the angle(s) between (a) projection(s) of (a) tangent(s) at the groove axis 301 on the plane 400 (parallel with the xy-plane (not depicted here for the sake of clarity)) and the optical axis O (in this plane 400 parallel with the xy-plane).

Hence, the invention provides an embodiment of the illumination device 1 comprising the lighting unit 2, as defined above, wherein one or more of the first collimating side edge 230 and the second collimating side edge 240 comprise ½ groove(s) 300. Or, in other words, an embodiment of the illumination device 1 comprising the lighting unit 2, as defined above, is provided, wherein one or more of the first collimating side edge 230 and the second collimating side edge 240 are slanted.

FIGS. 2a-2c have been depicted with two slanted collimating side edges 230,240, wherein the edges are antiparallel and a substantially symmetric collimator 200 is depicted. Note however that the side edges 230,240 may have different slant angles but may also be arranged parallel (like a parallelogram).

In another embodiment, one or more of the first collimating side edge 230 and the second collimating side edge 240 comprise a V-shape (in fact two half grooves 300 (with adjacent or coinciding tops)), respectively. FIGS. 3a-3c schematically depict an embodiment of the collimator 200 having side edges 230,240 with two ½ grooves 300 (in front, back/perspective, and top view, respectively). Such side edges 230, 240 are a kind of "double slanted" side edges. Side edges 230,240 comprising a V-shape (which is protruding) are indicated with references 232,242, respectively. FIG. 3b further indicates that the groove axes 301 substantially coincide with the "valleys" of the halve grooves 300. FIG. 3c is a top view of such embodiment. Note that a top view (or bottom view) of the embodiment schematically depicted in FIGS. 2a and 2b may be the same as this top view depicted in FIG. 3c.

As mentioned above, the (n*½) grooves 300 independently have a longitudinal axis 301 having a groove direction angle ω with the optical axis O ≧0° and <90°. The term "independently" herein indicates that, within physical boundaries, the direction angle ω of each individual groove may be selected independent from all other grooves. Note that in this embodiment, the grooves 300 of both side faces 230,240 virtually converge at a position P which may or which may not coincide with the light source 100. The virtual convergence point P may also be arranged behind the light source 100, or before the light source 100. The direction angle ω is especially determined in the plane 400 (not depicted) of the optical axis O and the longitudinal axis 301 of the groove 300, wherein such plane is substantially parallel to the first collimator surface 201 and/or the second collimator surface 202 (see also above).

Hence, the invention provides an embodiment of the illumination device 1 comprising the lighting unit 2, as defined above, wherein one or more of the first collimating side edge 230 and the second collimating side edge 240 comprise 2 half grooves 300, respectively, wherein the 2 half grooves have adjacent or coinciding tops. Or, in other words, an embodiment of the illumination device 1 comprising the lighting unit 2, as defined above, is provided, wherein one or more of the first collimating side edge 230 and the second collimating side edge 240 have a V-shape (protruding from the collimator side edges 230 and/or 240, respectively).

Figure 4A:
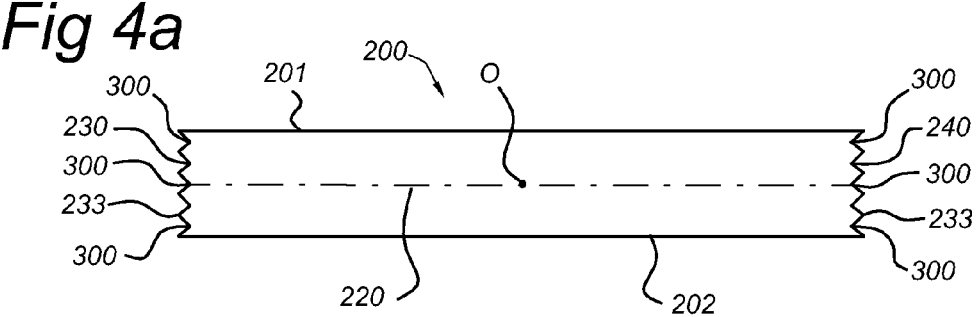
FIGS. 4a-4b schematically depict an embodiment of the collimator having side edges with a plurality of grooves (in front and back/perspective view, respectively)
Figure 4B:
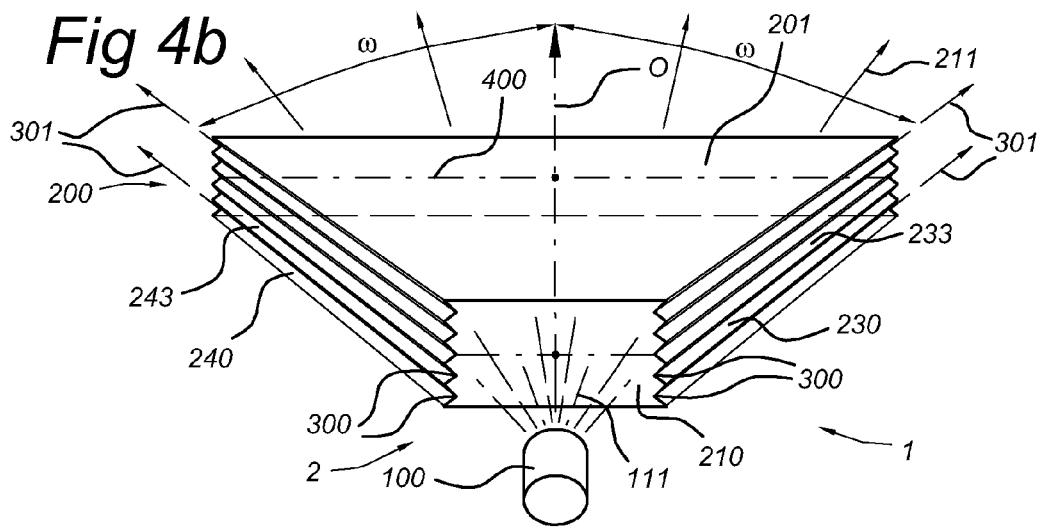

In yet another embodiment, one or more of the first collimating side edge 230 and the second collimating side edge 240 comprise a plurality of grooves 300. FIGS. 4a-4b schematically depict an embodiment of the collimator 200 having side edges 230,240 with a plurality of grooves 300 (in front and back/perspective view, respectively). Preferably (and as depicted here), the plurality of grooves 300 comprised by the one or more of the first collimating side edge 230 and the second collimating side edge 240 are substantially parallel, respectively. Hence, preferably the longitudinal axes 301 of the grooves 300 are arranged substantially parallel. Of course this applies to the longitudinal axes 301 of the subset of grooves comprised by the first side edge 230 and/or to the longitudinal axes 301 of the subset of grooves comprised by the second side edge 240; these grooves may be aligned mutually substantially parallel, respectively. Since the side edges 230,240 diverge, the plurality of grooves 300 on the first collimating side edge 230 and the plurality of grooves 300 on the second collimating side edge 240 may of course diverge from each other.

Hence, the invention provides an embodiment of the illumination device 1 comprising the lighting unit 2, as defined above, wherein one or more of the first collimating side edge 230 and the second collimating side edge 240 comprise a plurality of ½ grooves 300. Or, in other words, an embodiment of the illumination device 1 comprising the lighting unit 2, as defined above, is provided, wherein one or more of the first collimating side edge 230 and the second collimating side edge 240 comprise a corrugated structure of grooves 300.

The above embodiments may also be combined. For instance, a halve grooved side edge 230 or 240 may comprise a plurality of smaller grooves 300 (combination of embodiments schematically depicted in FIGS. 2a-2b and 4a-4b), etc.

Note that the groove direction angle ω for (half) grooves 300 comprised by one or more of the side edges 230,240 is (in symmetric collimators 200) substantially identical to ½γ (i.e. half opening angle of the collimator 200).

In addition to or alternative from the above mentioned groove(s) 300 on one or more of the first collimation side edge 230 and the second collimating side edge 240, one or more of the top collimator surface 201 and the bottom collimator surface 202 may comprise at least a single groove 300. In general however, one or more of these collimating surfaces 201,202 may comprise a plurality of grooves 300. FIGS. 5a-5d schematically depict embodiments of the collimator 200 having a plurality of grooves 300 comprised by the top and/or bottom collimator surfaces 201,202, respectively. For the sake of clarity, the side edges 230,240 do not comprise grooves 300, but of course, in a further embodiment, grooves 300 may also be comprised by one or more of these side edges 230,240.

Figure 5A:
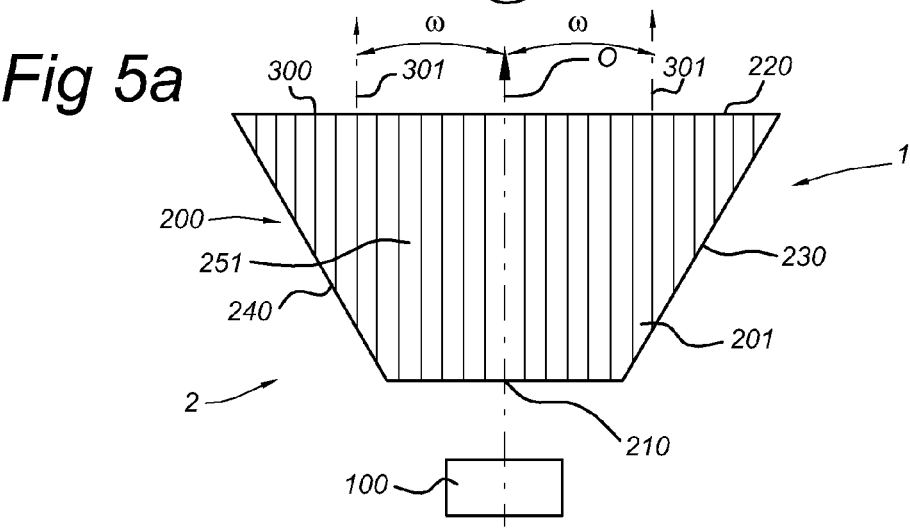
FIGS. 5a-5d schematically depict embodiments of the collimator having a plurality of grooves comprised by the top and/or bottom collimator surfaces, respectively.
Figure 5B:
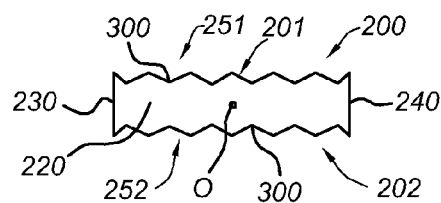
Figure 5C:
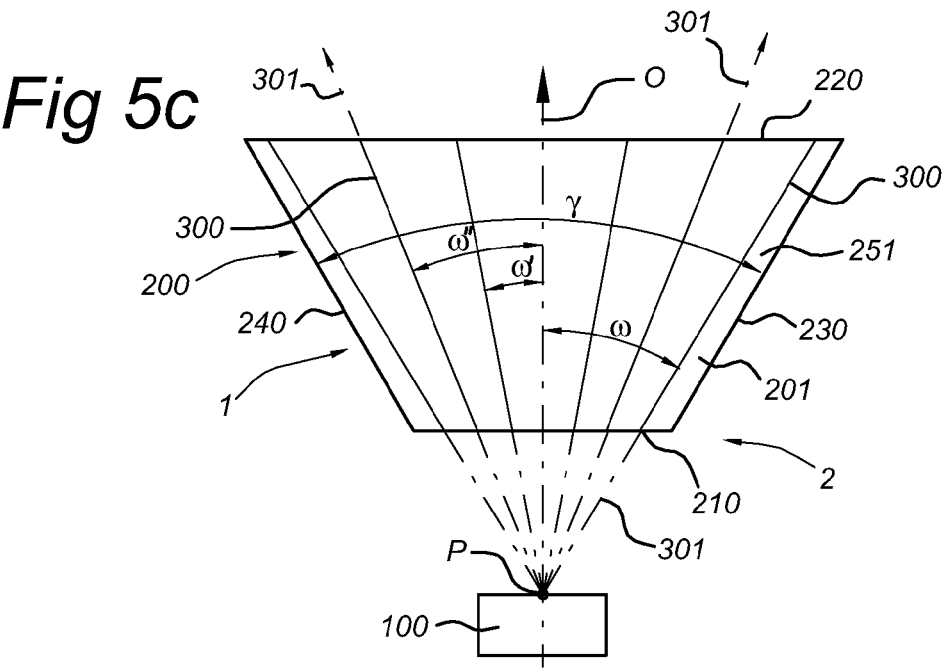
Figure 5D:
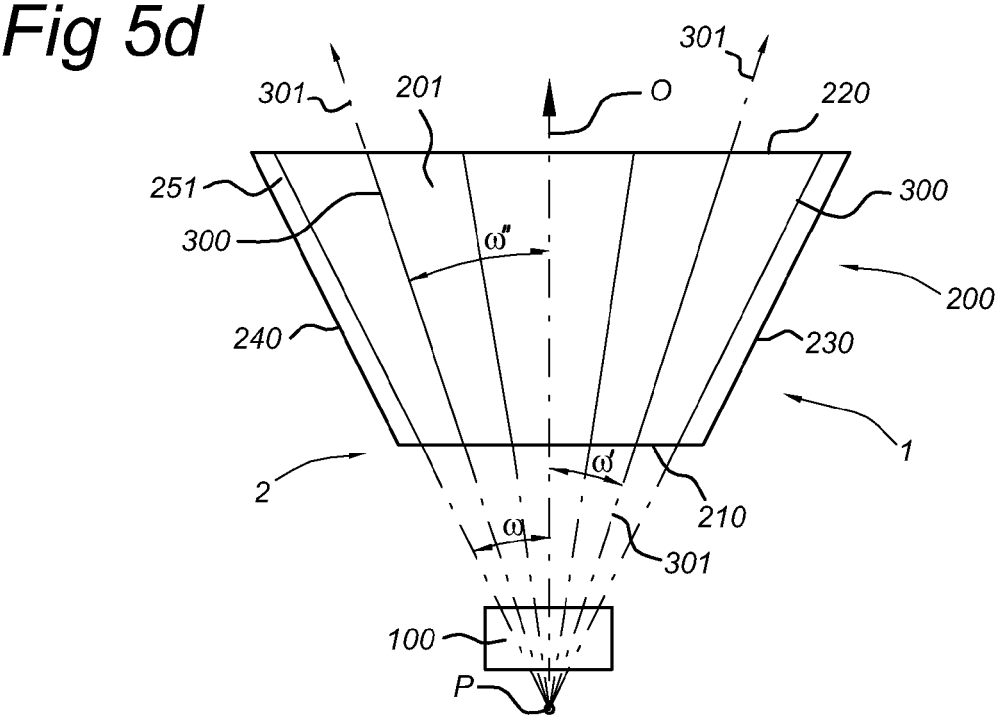

The top and bottom collimator surfaces 201,202 having grooves 300 are indicated with references 251 and 252, respectively. FIGS. 5a, 5c and 5d schematically depict top views, and (thus) show top collimator surface 201, here with grooves 300, thus also indicated with reference 251. However, these schematic pictures might correspondingly also schematically depict bottom collimator surface 202 comprising grooves 300, thus to be indicated with reference 252. FIG. 5b schematically shows a front view of the edge window 220; in this figure it is schematically depicted that both top and bottom collimator surfaces 201,202 having grooves 300.

The grooves 300 have again longitudinal axes 301 along or in the direction of the groove 300 with groove direction angle ω with the optical axis O. Each groove 300 may independently have a longitudinal axis 301 having a groove direction angle ω with the optical axis O $\geq 0°$ and $<90°$. In FIG. 5a, the grooves 300 virtually converge at a position P infinitely far upstream from the light source 100; i.e. the grooves 300 are arranged substantially parallel and the groove direction angles ω are thus substantially 0°. The virtual convergence point P may also be arranged (closer) behind (i.e. upstream from) the light source 100 (see FIG. 5d), before the light source 100, or at the light source 100 (FIG. 5c). In principle, the grooves 300 of one or more of the top collimator surface 201, the bottom collimator surface 202, the first collimating side edge 230 and the second collimating side edge 240, may converge at different positions P. In FIG. 5c, the arrangement of the grooves 300 is a radial arrangement, wherein the centre of the circle is at convergence point P.

The arrangement wherein the grooves 300 are comprised by one or more of the top and bottom collimator surfaces 201,202, and wherein the grooves 300 virtually converge at a position substantially coinciding with the light source 100 (i.e. especially substantially coinciding with the light emitting surface of such light source 100), is especially preferred since relatively high latitude collimation may be obtained (see also below).

The groove(s) 300 may for instance easily be provided by providing groove(s) 300 into one or more of the side edges 230,240 and top and bottom surfaces 201,202, of especially a solid transparent waveguide 40. By introducing V-shape groove(s) 300 or sinus-shape groove(s) 300 or other types of groove(s) 300, relatively easily the groove(s) 300 are provided, with reflective (due to (total) internal reflection (TIR) at the face(s) of the groove(s) 300. Such groove(s) may be obtained by etching or carving groove(s), thereby obtaining the grooves 300. However, other methods known to the person skilled in the art may also be applied, like injection moulding, or hot embossing, or replication of the groove, or laser cutting.

The (½) grooves, especially comprised by the top or bottom surfaces 201,202, or in the embodiment wherein the side edges 230,240 comprise a plurality of grooves, may for instance have a height in the range of about 0.05-2 mm. The ½ or single groove comprised by the side edges 230,240 may especially depend upon the height h1 of the collimator 200.

The grooves 300 may be directly neighbouring, but there may also be a distance between adjacent grooves 300. The grooves 300 may have a constant width and/or height, or the width and/or height, independently of each other, may vary over the length of the groove. In this way, the entire surface of the one or more of the top collimator surface 201, the bottom collimator surface 202, the first collimating side edge 230 and the second collimating side edge 240 may comprise the grooves 300, but it may also be chosen to leave spaces between two adjacent grooves 300.

In a preferred embodiment, especially in a radial arrangement of the grooves comprised by the top collimator surface 201 and/or the bottom collimator surface 202 (see FIG. 5c), such surface comprises at least 1 groove 300 per 10° waveguide azimuth angle γ, especially in the range of about 1-5 grooves 300 per 10° waveguide azimuth angle γ. In these embodiments, with radially arranged grooves 300, the groove angle ω varies over the top and/or bottom surfaces 201, 202, respectively. This is indicated in FIGS. 5c-5d with ω, ω', ω", etc.

As discussed above, the grooves 300 need not be V-grooves with a 90° top angle. E.g. V-grooves with other top angles, sinusoidal patterns or other curved patterns may also effective. The top angles of V-grooves is especially in the range from about 90° up to an angle <180°. This may also apply to the grooves 300 comprised by one or more of the side edges 230,240.

Hence, the invention provides an embodiment of the illumination device 1 comprising the lighting unit 2, as defined above, wherein one or more of the top collimator surface 201 and the bottom collimator surface 202 comprise a plurality of grooves 300, wherein the grooves 300 are arranged substantially parallel (thus also parallel with the optical axis O). Or, in other words, an embodiment of the illumination device 1 comprising the lighting unit 2, as defined above, is provided, wherein one or more of the top collimator surface 201 and the bottom collimator surface 202 comprise a corrugated structure of substantially parallel grooves 300. These embodiments are schematically depicted in FIGS. 5a and 5b.

Further, the invention provides an embodiment of the illumination device 1 comprising the lighting unit 2, as defined above, wherein one or more of the top collimator surface 201 and the bottom collimator surface 202 comprise a plurality of grooves 300, wherein the grooves 300 are arranged substantially radially with one or more convergence points P chosen upstream of the collimator 200, and preferably at or upstream of the light source 100). Or, in other words, an embodiment of the illumination device 1 comprising the lighting unit 2, as defined above, is provided, wherein one or more of the top collimator surface 201 and the bottom collimator surface 202 comprise a corrugated structure of radially arranged grooves 300, diverging in a direction from the entrance window 210 to the edge window 220.

FIGS. 6a-6e schematically depict embodiments of collimators 200 being integrated in a plate 1000. Such plate 1000 may comprise one or more collimators 200, and one single light source 100 serving the collimators 200 with light source light 111. Preferably however, the plate 1000 comprises a plurality of lighting units 2. Such embodiments are schematically depicted in FIGS. 6*a*-6*e*. Preferably, the plate 1000 is substantially flat.

These figures schematically depict embodiments of the illumination device 1 comprising the substantially flat plate 1000, which plate 1000 comprises the lighting unit 2. The plate 1000 has a top plate surface 1201, a bottom plate surface 1202, and a plate edge 1050. Preferably, the top collimator surface 201 coincides with at least part of the top plate surface 1201 or at least part of the bottom plate surface 1202 and the bottom collimator surface 202 coincides with at least part of the bottom plate surface 1202 or at least part of the top plate surface 1201, respectively (as mentioned above, the terms "top" and "bottom" are only used for the sake of clarity, and do not limit the orientation of the top or bottom feature under discussion). The shape of the plate 1000, especially the shape of the plate edge 1050 of the plate 1000 may in principle have any shape (seen from above (and/or below)), including circular or oval, pentagonal, hexagonal, etc. FIGS. 6*a*-6*e* schematically depict rectangular plates 1000, but the invention is not limited to such embodiments. Hence, in FIGS. 6*a*-6*e*, the edge 1050 is "subdivided" in a first plate edge 1051, a second plate edge 1052, and opposite thereof, a third plate edge 1053 and a fourth plate edge 1054, respectively. In this configuration, the length L3 of the second plate edge 1052 and the length L4 of the fourth plate edge 1054 are substantially equal. Likewise, the width w3 of the first plate edge 1051 and the width w4 of the third plate edge 1053 are substantially equal. FIG. 6*b* indicates the height h3 (or width) of the plate 1000, which is preferably substantially the same over the plate 1000.

The side edges 230,240 may conveniently be obtained by air slits, indicated with references 250, in the plate 1000. Such air slits 250 may be obtained with the same methods as described above with respect to the grooves 200, such as etching or carving groove(s), or injection moulding, or hot embossing, or laser cutting, etc.

The embodiments of the illumination device 1 schematically depicted in FIGS. 6*a*-6*e* comprise a plurality of lighting units 2. However, the illumination device 1, or (thus) such plate 1000, may also comprise only 1 lighting unit 2. To distinguish features of different collimators 200, here apostrophes are used. The one collimator 200 (first collimator) is indicated with reference 200', the second collimator 200 is indicated with reference 200", etc. Each lighting unit 2 has its individual optical axis O. These optical axes O may be aligned substantially parallel, but may also be arranged under an angle. This angle between two (adjacent) optical axes 200 is indicated with optical axes angle φ. In FIG. 6*a*, the optical axes angle φ is 0°. The optical axes angle φ is especially determined in the plane of the optical axes O of adjacent collimators 200, wherein such plane is substantially parallel to the top plate surface 1201 and/or the bottom plate surface 1202; or projections of those optical axes O on this virtual plane are used to determine the optical axes angle(s) φ.

FIG. 6*b* schematically depicts the first collimator 200' having straight side edges 230,240, which may comprise a plurality of grooves 300 (not drawn); likewise, the top collimator surface 201 and/or the bottom collimator surface 202 may comprise a plurality of grooves 300 (not drawn). The second collimator 200" has slanted edges 230,240, i.e. comprise both ½ groove 300.

Conveniently, collimators 200 in plate 1000 may share air slits 250. In this way, such air slit 250 may have an edge being a side edge of the first collimator 200' and having another edge being a side edge of the second (adjacent) collimator 200". Therefore, in a specific embodiment of the illumination device 1, the first collimating side edge 230 of the first collimator 200' is substantially parallel with the second collimating side edge 240 of the second collimator 200" adjacent to the first collimator 200'. Also part of the air slits 250 may be shared. Hence, in a specific embodiment of the illumination device 1, at least part of the first collimating side edge 230 of the first collimator 200' is substantially parallel with at least part of the second collimating side edge 240 of the second collimator 200" adjacent to the first collimator 200'.

FIGS. 6*c*-6*e* schematically depict a non-limiting number of embodiments, wherein the lighting units 2 flip each time their orientation. In this way, plate 1000 may for instance provide device light 211 at the edge 1050 (here first and third edges 1051 and 1053, respectively). FIG. 6*d* again shows a non-limiting number of ways in which air slits 250 can be shared, and thus in which the side edges 230,240 of the collimators 200 can be arranged. FIG. 6*e* schematically depicts plate 1000 comprising a plurality of lighting units 2, wherein each lighting unit 2 is mirrored relative to an adjacent lighting unit 2; i.e. each adjacent collimator 200 is mirrored relative to an adjacent other collimator 200. In these embodiments, the optical axes O of the collimators 200 have optical axes angles φ of about 180°.

The optical axes angle(s) φ may have any physically allowable value. Herein, the lighting units 2 are schematically depicted as being arranged with substantially parallel directions (optical axes O substantially parallel), i.e. optical axes angles φ of about 0° (FIG. 6*a*) or being arranged with substantially opposite directions of the optical axes O, i.e. optical axes angles φ of about 180° (FIG. 6*c*-6*e*), for adjacent collimators 200 (here adjacent lighting units 2).

The illumination device 1 may advantageously be used as a furniture 400 or in furniture, such as a furniture element 401. In a specific embodiment, the illumination device may be used as wall washer 500. Embodiments of such use is schematically depicted in FIG. 7. The illumination device 1 may be arranged to generate device light 211, which may have any predetermined colour, including white light. FIG. 7 schematically depicts a room 700, comprising a wall 701, a floor 702 and a ceiling 703. One of the illumination devices 1000 is used to wash the wall 701 (left); this illumination device may be arranged on floor 702. Such illumination devices may also be integrated in furniture, such as cupboards (not depicted), etc. Another illumination device 1000 is arranged to wash the wall 701 (right), this illumination device may be arranged to ceiling 703, or integrated into a shelve or console, etc. Further, one of the illumination devices 1000 is used a lamp (i.e. furniture), for instance above a table (not depicted), where functional white light is aimed on a table, and for instance colour variable atmosphere light to the ceiling.

Comparative examples have been performed, with a 1*1 mm Lambertian emitter light source (1 lm) and a light guide of 4 mm thickness. In the table below, and in the accompanying drawings 8*a*-8*j*, the outcome of these examples is summarized and depicted, respectively. In these drawings, axes ranging from 0-360, are the x-axis of the luminous intensity plots (candela on y-axes) related to the longitudinal luminous intensity of the device light 211, varying from 0-360°; axes ranging from 0-180, are the y-axis of the luminous intensity plots (candela on x-axes) related to the latitude luminous intensity of the device light 211, varying from 0-180°. These plots are lines plots of the beam cross-section of the light (i.e. beam) escaping from the collimator as device light 211.

Figure 8A:
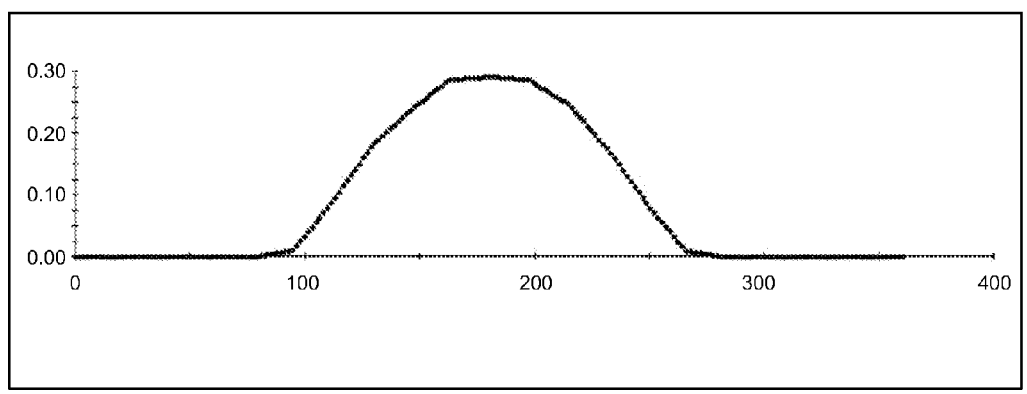
FIGS. 8a-8j show comparative examples of the collimation effects of the grooves comprised by the collimator.
Figure 8B:
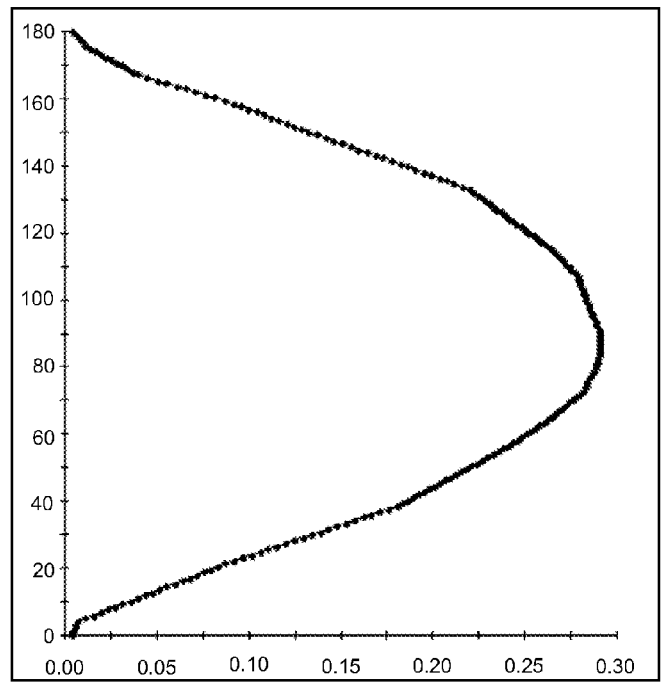
Figure 8C:
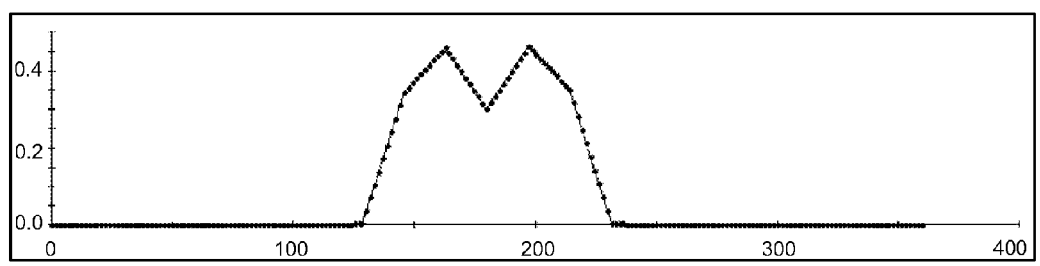
Figure 8D:
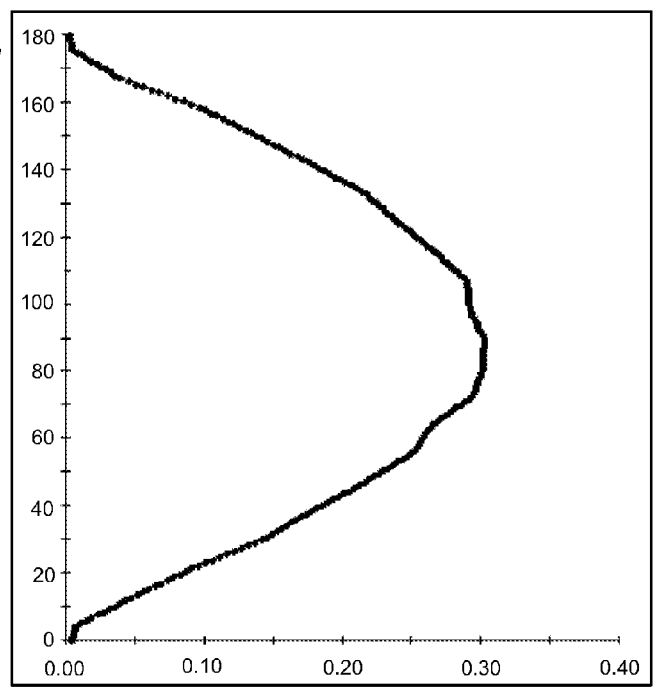
Figure 8E:
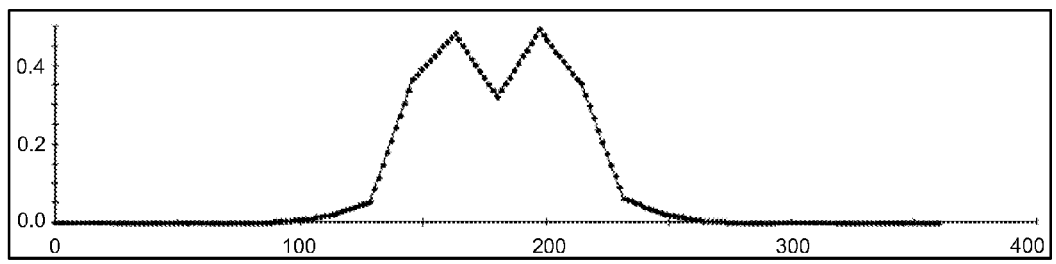
Figure 8F:
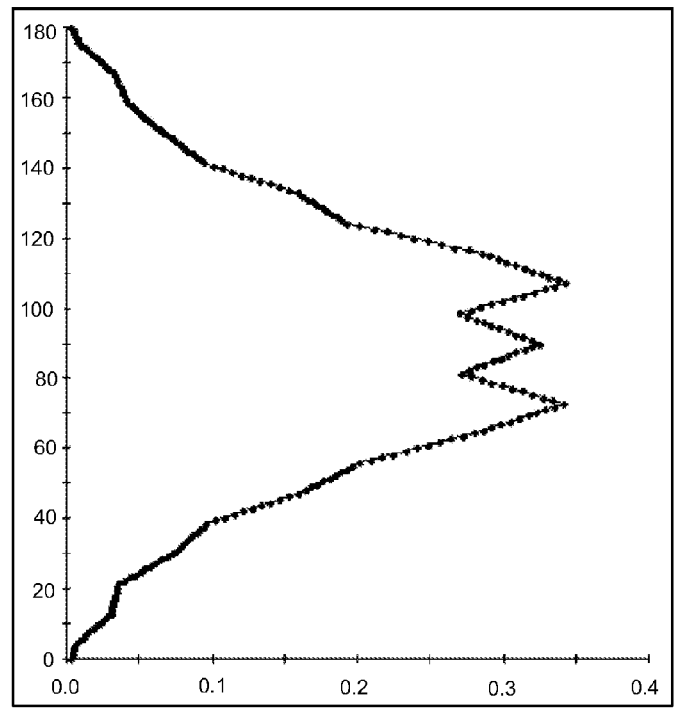
Figure 8G:
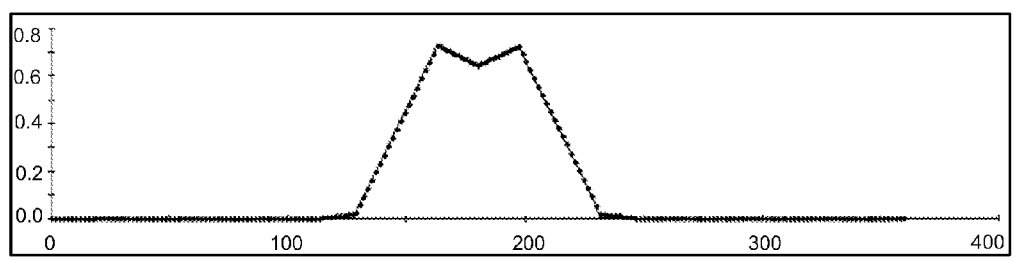
Figure 8H:
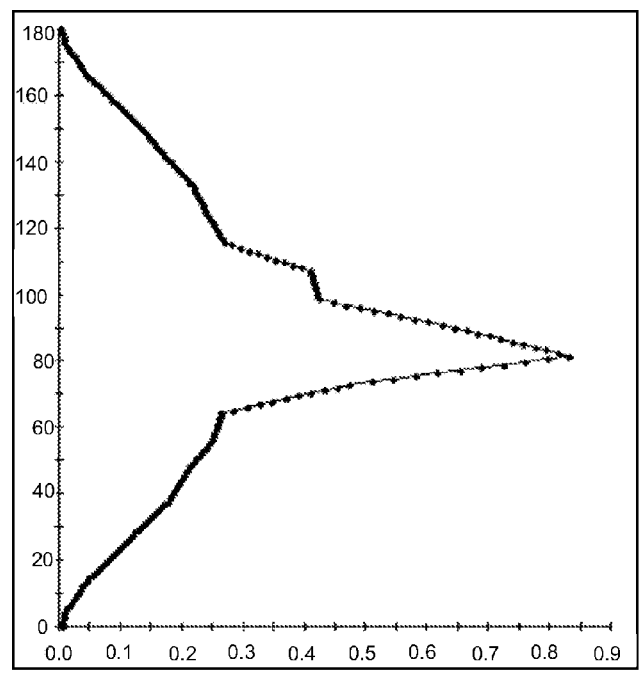
Figure 8I:
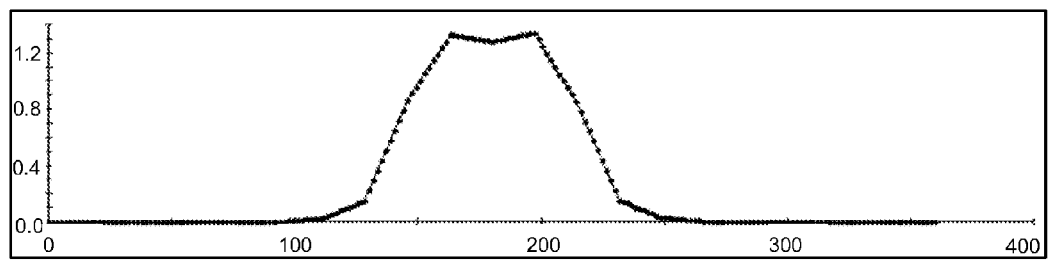
Figure 8J:
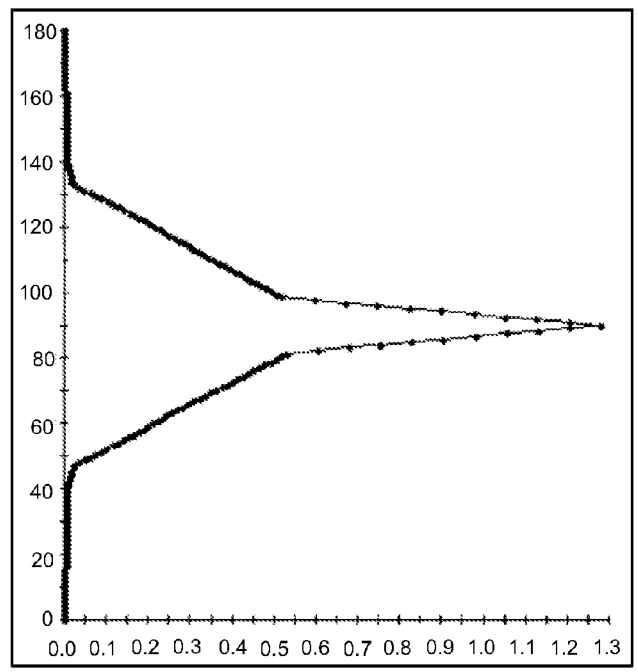

| Example | Collimator shape | Side edges grooves | Top/bottom surface grooves | Longitudinal FWHM width | Latitude FWHM width |
|---|---|---|---|---|---|
| 1 (comp.) | square waveguide 4 * 40 * 40 mm[1] | no | no | no | 2 * 58° (FIG. 8a) | 2 * 58° (FIG. 8b) |
| 2 (comp.) | 50° divergence of side edges | yes | no | no | 2 * 41° (FIG. 8c) | 2 * 58° (FIG. 8d) |
| 3 | 50° divergence of side edges | yes | no | yes (parallel; see FIG. 5a; both surfaces) | 2 * 41° (FIG. 8e) | 2 * 30° (FIG. 8f) |
| 4 | 50° divergence of side edges | yes | yes (half grooved side edges (see FIG. 2a/2b) | no | 2 * 35° (FIG. 8g) | 2 * 19° (FIG. 8h) |
| 5 | 50° divergence of side edges | yes | no | yes (diverging grooves; see FIG. 5c; both surfaces) | 2 * 39° (FIG. 8i) | 2 * 7° (FIG. 8j) |
| 6 | 50° divergence of side edges | yes | yes (multi-grooved side edges (see FIG. 4a/4b) | no | 2 * 38° (not depicted) | 2 * 19° (not depicted) |
| 7 | 50° divergence of side edges | yes | yes (multi-grooved side edges (see FIG. 4a/4b) | yes (diverging grooves; see FIG. 5c; both surfaces) | 2 * 39° (not depicted) | 2 * 7° (not depicted) |

[1]Height h1 (=h2) * length L1(=L2) * width W1 (=W2);
The dimensions for the other examples are similar, however, for example 1 W1 = W2; for the other examples W1 < W2 because of the diverging side edges.

From these data, it appears that collimation in the plane of the waveguide or collimator 200 (longitudinal collimation) can be improved by providing grooves 300 to one or more of the top collimator surface (201), the bottom collimator surface (202), the first collimating side edge (230) and the second collimating side edge (240), and in addition, in this way especially, surprisingly also collimation in the direction perpendicular to the waveguide or collimator 200 (latitudinal direction) may substantially be improved.

The term "substantially" herein, such as in "substantially all emission" or in "substantially consists", will be understood by the person skilled in the art. Likewise, the term "about" will be understood. The terms "substantially" or "about" may also include embodiments with "entirely", "completely", "all", "exactly, etc., where appropriate. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". For instance, the term "about 2°", may thus also relate to "2°".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination device arranged to generate illumination device light, the illumination device comprising a lighting unit, the lighting unit comprising:
   a light source, arranged to generate light source light, and
   a substantially flat collimator, arranged to collimate the light source light, the collimator having:
      an entrance window and an edge window,
      a top collimator surface and a bottom collimator surface, which are arranged substantially parallel,
      a first collimating side edge and a second collimating side edge, which are arranged to diverge from the entrance window to the edge window, and
      an optical axis (O),
   wherein the entrance window is arranged to receive the light source light of the light source, and wherein the edge window is arranged to allow the collimated light source light escape from the collimator as illumination device light;

wherein one or more of the top collimator surface, the bottom collimator surface, the first collimating side edge and the second collimating side edge comprise one or more grooves, each having a longitudinal axis having a groove direction angle ($\omega$) with the optical axis (O) $\geq 0°$ and $<90°$.

2. The illumination device according to claim 1, wherein one or more of the first collimating side edge and the second collimating side edge have a V-shape, respectively.

3. The illumination device according to claim 1, wherein one or more of the first collimating side edge and the second collimating side edge comprise a plurality of grooves, respectively, and wherein the plurality of grooves comprised by the one or more of the first collimating side edge and the second collimating side edge are substantially parallel, respectively.

4. The illumination device according to claim 1, wherein one or more of the top collimator surface and the bottom collimator surface comprise a plurality of grooves.

5. The illumination device according to claim 4, wherein the plurality of grooves virtually converge at a position (P) coinciding with the light source.

6. The illumination device according to claim 4, wherein the plurality of grooves virtually converge at a position (P) upstream of the light source.

7. The illumination device according to claim 4, wherein the plurality of grooves are arranged substantially parallel.

8. The illumination device according to claim 1, wherein the edge window has a slant angle ($\beta$) relative to the top collimator surface or the bottom collimator surface in the range of 35-105°.

9. The illumination device according to claim 1, wherein the collimator comprises a solid transparent waveguide.

10. The illumination device according to claim 1, comprising a substantially flat plate comprising the lighting unit, the plate having a top plate surface, a bottom plate surface, and a plate edge (1050), wherein the top collimator surface coincides with at least part of the top plate surface or at least part of the bottom plate surface and wherein the bottom collimator surface coincides with at least part of the bottom plate surface or at least part of the top plate surface.

11. The illumination device according to claim 10, wherein the illumination device comprises a plurality of lighting units.

12. The illumination device according to claim 11, wherein the first collimating side edge) of a first collimator is substantially parallel with the second collimating side edge of a second collimator adjacent to the first collimator.

* * * * *